(12) United States Patent
Saiki et al.

(10) Patent No.: US 8,932,669 B2
(45) Date of Patent: Jan. 13, 2015

(54) METHOD FOR PRODUCING ANTIGLARE FILM

(75) Inventors: Yuuki Saiki, Minami-Ashigara (JP); Kazuhiro Shiojiri, Minami-Ashigara (JP); Kazuhiro Oki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 961 days.

(21) Appl. No.: 13/121,386

(22) PCT Filed: Sep. 29, 2009

(86) PCT No.: PCT/JP2009/066942
§ 371 (c)(1),
(2), (4) Date: Mar. 28, 2011

(87) PCT Pub. No.: WO2010/035872
PCT Pub. Date: Apr. 1, 2010

(65) Prior Publication Data
US 2011/0177240 A1    Jul. 21, 2011

(30) Foreign Application Priority Data

Sep. 29, 2008 (JP) .................. 2008-250893
Oct. 15, 2008 (JP) .................. 2008-266248

(51) Int. Cl.
*B05D 5/06* (2006.01)
*G02B 1/11* (2006.01)
(Continued)

(52) U.S. Cl.
CPC ............... *G02B 1/111* (2013.01); *B05D 1/265* (2013.01); *B05D 7/5385* (2013.01); *B05D 2201/02* (2013.01); *B05D 2252/02* (2013.01)
USPC ........................................................ 427/162

(58) Field of Classification Search
USPC ........................................................ 427/162
See application file for complete search history.

(56) References Cited

U.S. PATENT DOCUMENTS

| 5,387,463 A | 2/1995 | Nakamura et al. |
| 6,945,656 B2 | 9/2005 | Takahashi et al. |

(Continued)

FOREIGN PATENT DOCUMENTS

| JP | 6-18706 A | 1/1994 |
| JP | 7-325203 A | 12/1995 |

(Continued)

OTHER PUBLICATIONS

Buxton & Clarke, Ordering polymer blend morphologies via solvent evaporation, EPL 78, p. 56006, May 24, 2007.*

(Continued)

*Primary Examiner* — Michael Cleveland
*Assistant Examiner* — James M Mellott
(74) *Attorney, Agent, or Firm* — Birch, Stewart, Kolasch & Birch, LLP

(57) ABSTRACT

A method for producing an antiglare film includes: a step of preparing coating liquids comprising components capable of being unevenly distributed in an antiglare layer-forming coating liquid and a low-refractive index layer-forming coating liquid, respectively; a coating step of applying the low-refractive index layer-forming coating liquid as an upper layer and the antiglare layer-forming coating liquid as a lower layer on a support to form a coating layer; and a drying step of drying the coating layer and making the coating layer cause phase-separation so as to unevenly distribute the components and form an antiglare layer and a low-refractive index layer. By the production method, an antiglare film which suppresses reflection and glaring of external light in a display and whitening due to irregular reflection can be produced at a low cost.

6 Claims, 10 Drawing Sheets

(51) Int. Cl.
*B05D 1/26* (2006.01)
*B05D 7/00* (2006.01)

(56) References Cited

U.S. PATENT DOCUMENTS

| | | | |
|---|---|---|---|
| 7,128,428 | B2 | 10/2006 | Takahashi et al. |
| 7,253,215 | B2 | 8/2007 | Takahashi et al. |
| 7,446,133 | B2 | 11/2008 | Takahashi et al. |
| 2007/0047087 | A1* | 3/2007 | Fukuda et al. ............... 359/582 |
| 2007/0207298 | A1* | 9/2007 | Suzuki et al. ............... 428/216 |
| 2008/0085406 | A1 | 4/2008 | Kusayanagi et al. |

FOREIGN PATENT DOCUMENTS

| | | | |
|---|---|---|---|
| JP | 10-172315 | A | 6/1998 |
| JP | 2002-196116 | A | 7/2002 |
| JP | 2004-61601 | A | 2/2004 |
| JP | 2004-126495 | A | 4/2004 |
| JP | 2004-306328 | A | 11/2004 |
| JP | 2005-292398 | A | 10/2005 |
| JP | 2006-106290 | A | 4/2006 |
| JP | 2006106290 | A * | 4/2006 |
| JP | 2007-4107 | | 1/2007 |
| JP | 2007-86764 | A | 4/2007 |
| JP | 2007-233185 | A | 9/2007 |
| JP | 2008-15527 | A | 1/2008 |
| WO | WO 2006/088151 | | 6/2006 |

OTHER PUBLICATIONS

Japanese Office Action for Application No. 2010-530900 dated May 13, 2013 (with partial English translation).
Chinese Office Action issued in corresponding Chinese patent application No. 200980138425.6 on Sep. 27, 2012. (with English translation).
International Preliminary Report on Patentability and Written Opinion of the International Searching Authority (Forms PCT/IB/326, PCT/IB/373 and PCT/ISA/237), dated Apr. 7, 2011, for Application No. PCT/JP2009/066942 (English translation thereof dated May 10, 2011).
Chinese Office Action issued in Chinese Patent Application No. 200980138425.6 on Jun. 6, 2013 with English translation.
Japanese Office Action for Application No. 2010-530900 dated Jan. 25, 2013 (with partial English translation).
International Search Report for PCT/JP2009/066942, mailed on Nov. 2, 2009.

* cited by examiner

FIG.4

| | PARTICLE | TOTAL PARTICLE WEIGHT IN PREPARATION (kg) | TOTAL SOLVENT WEIGHT IN PREPARATION (kg) | RATIO R OF PARTICLE TO SOLVENT (−) | HALF-VALUE TIME T OF SOLVENT (s) | INITIAL FILM THICKNESS D OF UPPER LAYER (LOW-REFRACTIVE INDEX LAYER) (m) | PARAMETER $(1/R) \times T \times D$ | WHITENING |
|---|---|---|---|---|---|---|---|---|
| EXAMPLE 1 | HYDROPHOBIZED PARTICLE | 0.2 | 82 | $2.44 \times 10^{-3}$ | 3 | $5 \times 10^{-5}$ | $6.15 \times 10^{-5}$ | EXCELLENT |
| COMPARATIVE EXAMPLE 1 | — | — | 82 | — | 3 | $5 \times 10^{-5}$ | — | POOR |
| COMPARATIVE EXAMPLE 2 | NON-HYDROPHOBIZED PARTICLE | 0.2 | 82 | $2.44 \times 10^{-3}$ | 3 | $5 \times 10^{-5}$ | — | POOR |
| EXAMPLE 2 | HYDROPHOBIZED PARTICLE | 0.2 | 82 | $2.44 \times 10^{-3}$ | 2.95 | $5 \times 10^{-5}$ | $6.05 \times 10^{-5}$ | GOOD |
| EXAMPLE 3 | HYDROPHOBIZED PARTICLE | 0.2 | 82 | $2.44 \times 10^{-3}$ | 2.5 | $5 \times 10^{-5}$ | $5.13 \times 10^{-5}$ | FAIR |
| EXAMPLE 4 | HYDROPHOBIZED PARTICLE | 0.2 | 81 | $2.47 \times 10^{-3}$ | 3 | $4.94 \times 10^{-5}$ | $6.00 \times 10^{-5}$ | GOOD |
| EXAMPLE 5 | HYDROPHOBIZED PARTICLE | 0.2 | 75 | $2.67 \times 10^{-3}$ | 3 | $4.50 \times 10^{-5}$ | $5.06 \times 10^{-5}$ | FAIR |
| EXAMPLE 6 | HYDROPHOBIZED PARTICLE | 0.1 | 82 | $1.22 \times 10^{-3}$ | 1.5 | $5 \times 10^{-5}$ | $6.15 \times 10^{-5}$ | GOOD |
| EXAMPLE 7 | HYDROPHOBIZED PARTICLE | 0.1 | 82 | $1.22 \times 10^{-3}$ | 1.2 | $5 \times 10^{-5}$ | $4.92 \times 10^{-5}$ | FAIR |
| EXAMPLE 8 | HYDROPHOBIZED PARTICLE | 0.1 | 60 | $1.67 \times 10^{-3}$ | 3 | $3.50 \times 10^{-5}$ | $6.30 \times 10^{-5}$ | GOOD |
| EXAMPLE 9 | HYDROPHOBIZED PARTICLE | 0.1 | 45 | $2.22 \times 10^{-3}$ | 3 | $2.57 \times 10^{-5}$ | $3.65 \times 10^{-5}$ | FAIR |

FIG.7A-A

| | ANTIGLARE LAYER-FORMING COATING LIQUID (LOWER LAYER) | LOW-REFRACTIVE INDEX LAYER-FORMING COATING LIQUID (UPPER LAYER) | | LAYER FIRST INITIATING PHASE SEPARATION |
|---|---|---|---|---|
| | RESIN MATERIALS | FIRST POLYMER | RESIN MATERIAL | |
| EXAMPLE 1 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 2 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 3 | CELLULOSE ACETATE PROPIONATE & ACRYLIC RESIN | COPOLYMER OF 2,2,2-TRIFLUOROETHYL ACRYLATE | ACRYLIC RESIN | UPPER AND LOWER LAYERS SIMULTANEOUSLY |
| EXAMPLE 4 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 5 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 6 | CELLULOSE ACETATE PROPIONATE & ACRYLIC RESIN | COPOLYMER OF 2,2,2-TRIFLUOROETHYL ACRYLATE | ACRYLIC RESIN | UPPER AND LOWER LAYERS SIMULTANEOUSLY |
| EXAMPLE 7 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 8 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 9 | CELLULOSE ACETATE PROPIONATE & ACRYLIC RESIN | COPOLYMER OF 2,2,2-TRIFLUOROETHYL ACRYLATE | LOWER LAYER | LOWER LAYER |
| EXAMPLE 10 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 11 | CELLULOSE ACETATE PROPIONATE & ACRYLIC RESIN | COPOLYMER OF 2,2,2-TRIFLUOROETHYL ACRYLATE | ACRYLIC RESIN | UPPER LAYER |
| EXAMPLE 12 | CELLULOSE ACETATE PROPIONATE & ACRYLIC RESIN | COPOLYMER OF 2,2,2-TRIFLUOROETHYL ACRYLATE | ACRYLIC RESIN | LOWER LAYER |
| COMPARATIVE EXAMPLE 1 | CELLULOSE ACETATE PROPIONATE & ACRYLIC RESIN | | ACRYLIC RESIN | — |
| COMPARATIVE EXAMPLE 2 | CELLULOSE ACETATE PROPIONATE & ACRYLIC RESIN | | ALKYLSILANE-BASED COMPOUND & ACRYLIC RESIN | UPPER LAYER |

FIG.7A-B

| | TIMING FOR LOWER LAYER TO INITIATE PHASE SEPARATION | COMPONENT RATIO OF UPPER LAYER FLUOROSILANE-BASED COMPOUND: ACRYLIC RESIN: MEK | COMPONENT RATIO OF LOWER LAYER CELLULOSE ACETATE PROPIONATE (POLYSTYRENE): ACRYLIC RESIN: MEK | EVALUATION OF WHITENING |
|---|---|---|---|---|
| EXAMPLE 1 | AFTER INITIATION OF SPINODAL DECOMPOSITION OF UPPER LAYER | 4:14:82 | 2.1:15.9:82 | EXCELLENT |
| EXAMPLE 2 | BEFORE INITIATION OF SPINODAL DECOMPOSITION OF UPPER LAYER | 2.5:15.5:82 | 2.1:15.9:82 | GOOD |
| EXAMPLE 3 | — | 2.1:15.9:82 | 2.1:15.9:82 | FAIR |
| EXAMPLE 4 | AFTER INITIATION OF SPINODAL DECOMPOSITION OF UPPER LAYER | 4:14:82 | 2.3:15.7:82 | EXCELLENT |
| EXAMPLE 5 | BEFORE INITIATION OF SPINODAL DECOMPOSITION OF UPPER LAYER | 4:14:82 | 3.5:14.5:82 | GOOD |
| EXAMPLE 6 | — | 4:14:82 | 4:14:82 | FAIR |
| EXAMPLE 7 | AFTER INITIATION OF SPINODAL DECOMPOSITION OF UPPER LAYER | 4:14:70 | 4:14:82 | EXCELLENT |
| EXAMPLE 8 | BEFORE INITIATION OF SPINODAL DECOMPOSITION OF UPPER LAYER | 4:14:79 | 4:14:82 | GOOD |
| EXAMPLE 9 | — | 4:14:85 | 4:14:82 | FAIR |
| EXAMPLE 10 | AFTER INITIATION OF SPINODAL DECOMPOSITION OF UPPER LAYER | 2.1:15.9:80 | 2.1:15.9:95 | EXCELLENT |
| EXAMPLE 11 | BEFORE INITIATION OF SPINODAL DECOMPOSITION OF UPPER LAYER | 2.1:15.9:80 | 2.1:15.9:82 | GOOD |
| EXAMPLE 12 | — | 2.1:15.9:80 | 2.1:15.9:77 | FAIR |
| COMPARATIVE EXAMPLE 1 | — | 0:18:82 | 2.1:15.9:82 | POOR |
| COMPARATIVE EXAMPLE 2 | — | 0:18:82 | 2.1:15.9:82 | POOR |

FIG.7B-A

| | ANTIGLARE LAYER-FORMING COATING LIQUID (LOWER LAYER) RESIN MATERIALS | LOW-REFRACTIVE INDEX LAYER-FORMING COATING LIQUID (UPPER LAYER) | | LAYER FIRST INITIATING PHASE SEPARATION |
|---|---|---|---|---|
| | | FIRST POLYMER | RESIN MATERIAL | |
| EXAMPLE 13 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 14 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 15 | POLYSTYRENE & ACRYLIC RESIN | COPOLYMER OF 2,2,2-TRIFLUOROETHYL ACRYLATE | ACRYLIC RESIN | UPPER AND LOWER LAYERS SIMULTANEOUSLY |
| EXAMPLE 16 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 17 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 18 | POLYSTYRENE & ACRYLIC RESIN | COPOLYMER OF 2,2,2-TRIFLUOROETHYL ACRYLATE | ACRYLIC RESIN | UPPER AND LOWER LAYERS SIMULTANEOUSLY |
| EXAMPLE 19 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 20 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 21 | POLYSTYRENE & ACRYLIC RESIN | COPOLYMER OF 2,2,2-TRIFLUOROETHYL ACRYLATE | ACRYLIC RESIN | LOWER LAYER |
| EXAMPLE 22 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 23 | POLYSTYRENE & ACRYLIC RESIN | COPOLYMER OF 2,2,2-TRIFLUOROETHYL ACRYLATE | ACRYLIC RESIN | UPPER LAYER |
| EXAMPLE 24 | POLYSTYRENE & ACRYLIC RESIN | COPOLYMER OF 2,2,2-TRIFLUOROETHYL ACRYLATE | ACRYLIC RESIN | LOWER LAYER |
| COMPARATIVE EXAMPLE 3 | POLYSTYRENE & ACRYLIC RESIN | | ACRYLIC RESIN | — |
| COMPARATIVE EXAMPLE 4 | POLYSTYRENE & ACRYLIC RESIN | | ALKYLSILANE-BASED COMPOUND & ACRYLIC RESIN | UPPER LAYER |

FIG.7B-B

| | TIMING FOR LOWER LAYER TO INITIATE PHASE SEPARATION | COMPONENT RATIO OF UPPER LAYER FLUOROSILANE-BASED COMPOUND: ACRYLIC RESIN:MEK | COMPONENT RATIO OF LOWER LAYER CELLULOSE ACETATE PROPIONATE (POLYSTYRENE):ACRYLIC RESIN:MEK | EVALUATION OF WHITENING |
|---|---|---|---|---|
| EXAMPLE 13 | AFTER INITIATION OF SPINODAL DECOMPOSITION OF UPPER LAYER | 4:14:82 | 1.5:16.5:82 | EXCELLENT |
| EXAMPLE 14 | BEFORE INITIATION OF SPINODAL DECOMPOSITION OF UPPER LAYER | 2.5:15.5:82 | 1.5:16.5:82 | GOOD |
| EXAMPLE 15 | — | 2.1:15.9:82 | 1.5:16.5:82 | FAIR |
| EXAMPLE 16 | AFTER INITIATION OF SPINODAL DECOMPOSITION OF UPPER LAYER | 4:14:82 | 2.3:15.7:82 | EXCELLENT |
| EXAMPLE 17 | BEFORE INITIATION OF SPINODAL DECOMPOSITION OF UPPER LAYER | 4:14:82 | 3.5:14.5:82 | GOOD |
| EXAMPLE 18 | — | 4:14:82 | 4:14:82 | FAIR |
| EXAMPLE 19 | AFTER INITIATION OF SPINODAL DECOMPOSITION OF UPPER LAYER | 4:14:70 | 4:14:82 | EXCELLENT |
| EXAMPLE 20 | BEFORE INITIATION OF SPINODAL DECOMPOSITION OF UPPER LAYER | 4:14:79 | 4:14:82 | GOOD |
| EXAMPLE 21 | — | 4:14:85 | 4:14:82 | FAIR |
| EXAMPLE 22 | AFTER INITIATION OF SPINODAL DECOMPOSITION OF UPPER LAYER | 1.5:16.5:82 | 1.5:16.5:93 | EXCELLENT |
| EXAMPLE 23 | BEFORE INITIATION OF SPINODAL DECOMPOSITION OF UPPER LAYER | 1.5:16.5:82 | 1.5:16.5:82 | GOOD |
| EXAMPLE 24 | — | 1.5:16.5:82 | 1.5:16.5:79 | FAIR |
| COMPARATIVE EXAMPLE 3 | — | 0:18:82 | 1.5:16.5:82 | POOR |
| COMPARATIVE EXAMPLE 4 | — | 0:18:82 | 1.5:16.5:82 | POOR |

METHOD FOR PRODUCING ANTIGLARE FILM

TECHNICAL FIELD

The present invention relates to a method for producing an antiglare film used for various types of displays, and particularly to a method for producing an antiglare film which can suppress the reflection and glaring of external light in a display and the whitening due to irregular reflection.

BACKGROUND ART

Various types of displays such as cathode-ray tube displays, liquid crystal displays, plasma displays and organic EL displays generally have a problem that if an indoor fluorescent lamp, external solar light or the like is reflected in the display, the display cannot be seen well due to the reflection light. In order to solve the problem, an antiglare film is affixed on the display surface to scatter reflected light of a light source to improve the visibility.

As such an antiglare film, various types of films are proposed, but for example, Patent Literature 1 shown below discloses a method in which an uneven form is fabricated on the surface by using particles such as resin beads to scatter light. Patent Literature 2 discloses a method in which a surface unevenness is formed by utilizing the spinodal decomposition of a resin without using particles.

Methods are proposed in which a low-refractive index layer is formed on the surface to reduce the reflectance; for example, Patent Literature 3 discloses a method in which an inorganic material is formed by a gas phase method, and Patent Literature 4 discloses a method in which a fluorine-containing overcoat layer is formed.

Patent Literature 5 discloses a method for forming an antiglare layer and a low-refractive index layer by one-time application, in which the antiglare layer is developed by particles and a fluoroalkylsilane compound which is a polymer having a low refractive index and easily unevenly distributing on the surface is simultaneously applied, thereby preventing productivity deterioration due to successive applications. Patent Literature 6 enables both the antiglare property and the low-reflection property by controlling convexo-concave structure on the surface with utilization of self-organization of particles having different sizes. Patent Literature 7 discloses a method for forming a low-refractive index layer on an antiglare layer by simultaneous multi-layering.

CITATION LIST

Patent Literature

PTL 1: Japanese Patent Application Laid-Open No. 6-18706

PTL 2: Japanese Patent Application Laid-Open No. 2004-126495

PTL 3: Japanese Patent Application Laid-Open No. 7-325203

PTL 4: Japanese Patent Application Laid-Open No. 2004-306328

PTL 5: Japanese Patent Application Laid-Open No. 2002-196116

PTL 6: Japanese Patent Application Laid-Open No. 2008-15527

PTL 7: Japanese Patent Application Laid-Open No. 2007-233185

SUMMARY OF INVENTION

Technical Problem

However, an antiglare film using a resin particle as described in Patent Literature 1 needs to use particles having uniform diameters, and is disadvantageous in the cost. Since an antiglare film utilizing a phase separation as described in Patent Literature 2 easily deforms its internal depending on conditions in evaporation and the like, the antiglare film is difficult to produce stably. Additionally, antiglare films only provided on their surface with unevenness exhibit strong surface irregular reflection and have a problem of the film surfaces whitening.

Although the methods described in Patent Literatures 3 and 4 can solve the problem of the film whitening, the method of Patent Literature 3 has a poor productivity and has a cost problem. The method described in Patent Literature 4 has poor productivity, since a low-refractive index layer needs to be applied after an antiglare layer is imparted and multiple layers are successively formed. Additionally, if the simultaneous multi-layer application is carried out, the layers diffuse to be mixed into each other, thereby causing a problem that the low-refractive index layer cannot be formed uniformly on the surface.

The method described in Patent Literature 5 has a problem that the reflective function is insufficient, since the layers are applied simultaneously and the layer of the fluoroalkylsilane compound unevenly distributed on the surface does not yield a sufficient difference in refractive index from the lower layer. The film described in Patent Literature 6 has a problem that the cost is high, since a large amount of inorganic particles is required to use. The method described in Patent Literature 7 needs to use a thickener exhibiting a high viscosity, since if the lower layer has a low viscosity, particles easily move and diffuse inside and are mixed. However, although the method can prevent the layer mixing, the application rate decreases, thereby deteriorating productivity.

The present invention has been achieved in consideration of such situations, and has an object to provide a production method which can produce an antiglare film suppressing the reflection and glaring of external light in various types of displays and the whitening due to irregular reflection, at a low cost.

Solution to Problem

A first aspect of the present invention, in order to achieve the above-mentioned object, provides a method for producing an antiglare film, comprising: a step of preparing coating liquids comprising components capable of being unevenly distributed in an antiglare layer-forming coating liquid and a low-refractive index layer-forming coating liquid, respectively; a coating step of applying the low-refractive index layer-forming coating liquid as an upper layer and the antiglare layer-forming coating liquid as a lower layer on a support to form a coating layer; and a drying step of drying the coating layer and making the coating layer cause phase-separation so as to unevenly distribute the components and form an antiglare layer and a low-refractive index layer.

According to the first aspect, since coating liquids comprising components capable of being unevenly distributed in each of an antiglare layer-forming coating liquid and a low-refractive index layer-forming coating liquid are prepared and applied on a support, and the coating layer is dried and made to cause phase-separation so as to unevenly distribute the components and form an antiglare layer and a low-refractive index layer, an antiglare film suppressing the reflection and glaring of external light in various types of displays and the whitening due to irregular reflection can be produced at a low cost.

A second aspect of the present invention, in order to achieve the above-mentioned object, provides a method for producing an antiglare film, comprising: a step of preparing at least one antiglare layer-forming coating liquid in which at least two resin materials incompatible with each other are dissolved in at least one solvent, and a low-refractive index layer-forming coating liquid in which a resin material and hydrophobic particles are dissolved in a solvent; a coating step of applying the low-refractive index layer-forming coating liquid as an upper layer and the antiglare layer-forming coating liquid as a lower layer on a support to form a coating layer; a particle movement step of moving the particles to a gas-liquid interface of the coating layer; and a drying step of drying the coating layer and making the coating layer cause phase-separation so as to form an antiglare layer and a low-refractive index layer.

A second aspect is designed, as modes of the antiglare layer-forming coating liquid and the low-refractive index layer-forming coating liquid including components capable of being unevenly distributed, to prepare at least one antiglare layer-forming coating liquid in which at least two resin materials incompatible with each other are dissolved in at least one solvent, and a low-refractive index layer-forming coating liquid in which a resin material and a hydrophobic particle are dissolved in a solvent.

According to the second aspect, the low-refractive index layer-forming coating liquid as an upper layer and the antiglare layer-forming coating liquid as a lower layer are applied, and the particles can be moved to an upper portion of the coating layer (gas-liquid interface) simultaneously with the application because the particles contained in the low-refractive index layer-forming coating liquid are hydrophobic. Therefore, since the particle movement step can be shortened, the productivity can be raised. In the drying step, when the phase separation occurs, since there are almost no particles in the lower portion in the low-refractive index layer, the particles can be prevented from being involved in the antiglare layer.

In this case, when the low-refractive index layer and the antiglare layer are formed by one-time simultaneous multi-layer application, the productivity can be improved. In addition, since the low-refractive index layer is formed of particles, the difference in refractive index from the antiglare layer is easily yielded, and the whitening of the film can be prevented.

Further, since convexo-concave is formed on the surface of the antiglare layer by utilizing spinodal decomposition due to at least two resin materials, convexo-concave can be evenly formed without using particles, and the production cost can thereby be reduced.

According to a third aspect, in the second aspect, 80% or more of particles in the low-refractive index layer-forming coating liquid is contained in the low-refractive index layer.

The third aspect prescribes the proportion of particles contained in the low-refractive index layer. By making the proportion of particles in the range described above, a sufficient refractive index difference can be yielded between the low-refractive index layer and an antiglare layer.

Since particles not present in the low-refractive index layer are present in the antiglare layer, when the particles in the low-refractive index layer are less, a refractive index difference can hardly be yielded between the low-refractive index layer and the antiglare layer.

According to a fourth aspect, in the second aspect or third aspect, when a ratio of the particles to the solvent in the low-refractive index layer-forming coating liquid is represented by r [-], a time until the solvent decreases to half is represented by t [s], and an initial film thickness of the upper layer in the coating step is represented by d [m], the factors, r, t and d are adjusted so that multiplication of 1/r and t and d satisfies $6 \times 10^{-2}$ or more.

Since the fourth aspect sets each factor so that the multiplication of 1/r and t and d satisfies $6 \times 10^{-2}$ or more, a low-refractive index layer can be formed as the upper layer while preventing sedimentation of particles in the lower layer.

A fifth aspect of the present invention, in order to achieve the above-mentioned object, provides a method for producing an antiglare film, comprising: a coating liquid preparation step of preparing an antiglare layer-forming coating liquid in which at least two resin materials incompatible with each other are dissolved in at least one solvent, and a low-refractive index layer-forming coating liquid in which a first polymer whose substituent contains a molecular structure to decrease a refractive index of whole polymer and one or more resin materials which form a phase-separation structure with the first polymer are dissolved in at least one solvent; a coating step of applying the low-refractive index layer-forming coating liquid as an upper layer and the antiglare layer-forming coating liquid as a lower layer on a support to form a coating layer; and a drying step of drying the coating layer making the low-refractive index layer-forming coating liquid and the antiglare layer-forming coating liquid cause phase-separation so as to form a low-refractive index layer and an antiglare layer.

The fifth aspect is designed, as modes of an antiglare layer-forming coating liquid and a low-refractive index layer-forming coating liquid comprising components capable of being unevenly distributed, to prepare an antiglare layer-forming coating liquid in which at least two resin materials incompatible with each other are dissolved in at least one solvent, and a low-refractive index layer-forming coating liquid in which a first polymer whose substituent contains a molecular structure to decrease the refractive index of whole polymer and one or more resin materials that form a phase-separation structure with the first polymer are dissolved in at least one solvent.

According to the fifth aspect, the low-refractive index layer-forming coating liquid as the upper layer and the antiglare layer-forming coating liquid as the lower layer are applied, and the polymer whose substituent contains a molecular structure to decrease the refractive index of the whole polymer is unevenly distributed in the low-refractive index layer by utilizing the spinodal decomposition due to the polymer whose substituent contains a molecular structure to decrease the refractive index of the whole polymer and other one or more resin materials in the upper layer. Thereby, since the polymer whose substituent contains a molecular structure to decrease a refractive index of the whole polymer can be disposed in the upper side than the surface of the antiglare layer formed after the coating layer as a lower layer is dried, a low-refractive index layer can be formed. Therefore, there is no need to use particles such as hollow silica, and an antiglare film can be produced advantageously in the cost.

In this case, if the upper layer and the lower layer are simultaneously applied as multiple layers, since a low-refractive index layer and an antiglare layer can be formed by one-time application, the productivity can be improved. Since the low-refractive index layer is formed using a polymer whose substituent contains a molecular structure to decrease the refractive index of the whole polymer, the difference in refractive index from the antiglare layer is easily yielded, and the whitening of the film can be prevented.

Further, since convexo-concave is formed on the surface of the antiglare layer by utilizing the spinodal decomposition due to at least two resin materials, convexo-concave can be evenly formed without using particles, and the production cost can thereby be reduced.

According to a sixth aspect, in the fifth aspect, the molecular structure to decrease the refractive index of the whole polymer, which is contained in the substituent contained in the first polymer is a molecular structure containing a fluorine molecule.

The sixth aspect defines a molecular structure contained in the substituent contained in the first polymer contained in the low-refractive index layer to decrease a refractive index of the whole polymer, and a molecular structure containing a fluorine molecule is preferable. Using the molecular structure containing a fluorine molecule can particularly develop the effect.

According to a seventh aspect, in the fifth aspect or the sixth aspect, a ratio of the first polymer and the resin material to the solvent in the low-refractive index layer-forming coating liquid, and a ratio of the resin materials to the solvent in the antiglare layer-forming coating liquid are adjusted in the coating liquid preparation step so that an initiation of the layer separation of the low-refractive index layer-forming coating liquid is earlier than an initiation of the phase separation of the antiglare layer-forming coating liquid in the drying step.

In the seventh aspect, by adjusting ratios of components contained in the low-refractive index layer-forming coating liquid and the antiglare layer-forming coating liquid, it becomes possible to control times at which the phase separations of the low-refractive index layer-forming coating liquid and the antiglare layer-forming coating liquid in the drying step are initiated so as to make the initiation of the phase separation of the low-refractive index layer-forming coating liquid occur earlier than the initiation of the phase separation of the antiglare layer-forming coating liquid. Thereby, since the first polymer contained in the low-refractive index layer-forming coating liquid can be prevented from being involved in the antiglare layer, a difference in the refractive index can be yielded.

According to an eighth aspect, in the seventh aspect, the ratio of the first polymer and the resin material to the solvent in the low-refractive index layer-forming coating liquid, and the ratio of the resin materials to the solvent in the antiglare layer-forming coating liquid are adjusted in the coating liquid preparation step so that the initiation of the phase separation of the antiglare layer-forming coating liquid is later than an initiation of spinodal decomposition of the low-refractive index layer-forming coating liquid in the drying step.

In the eighth aspect, by making the initiation of the phase separation of the antiglare layer-forming coating liquid occur later than the initiation of the spinodal decomposition of the low-refractive index layer-forming coating liquid, it becomes possible to prevent the first polymer contained in the low-refractive index layer-forming coating liquid from being involved in the phase separation of the antiglare layer-forming coating liquid. Therefore, an antiglare film in which a refractive index difference is yielded between the low-refractive index layer and the antiglare layer can be provided. Specifically, when the spinodal decomposition of the low-refractive index layer-forming coating liquid is initiated, the first polymer having been unevenly distributed in the low-refractive index layer-forming coating liquid is fixed in the layer, and thus the first polymer becomes unable to move from its present position. Therefore, since the phase separation of the antiglare layer-forming coating liquid is initiated after of the position of the first polymer is fixed, the first polymer is distributed more unevenly in the low-refractive index layer than in the seventh aspect, and the probability of involvement of the first polymer in the phase separation of the antiglare layer-forming coating liquid can be reduced, an antiglare film in which a larger refractive index difference is yielded between the low-refractive index layer and the antiglare layer can be provided.

The progression process of the phase separation passes through during the spinodal period after a binodal period. The binodal refers to a state in which the phase separation of two resins is progressing; and the spinodal refers to a period in which a structure separated during the binodal period is fixed. In the spinodal period, the phase separation of the two resins does not progress, and the two resins are fixed with the structural state as it is. In the present invention, the "phase separation" refers to the whole process containing both of the binodal and the spinodal, and the "spinodal decomposition" refers to a phenomenon in which the structure is being fixed during the spinodal period.

Advantageous Effects of Invention

According to the method for producing an antiglare film according to the present invention, an antiglare film which suppress the reflection and glaring of external light in various types of displays and the whitening due to irregular reflection can be produced at a low cost.

Further in the second aspect, when a low-refractive index layer-forming coating liquid as an upper layer and an antiglare layer-forming coating liquid as a lower layer are simultaneously applied, since particles can be positioned in the upper portion of the coating layer at the time of the application, a particle movement step can be shortened. Additionally, since the low-refractive index layer and the antiglare layer can be formed by one-time application, the productivity can be improved.

Further, since the low-refractive index layer is formed of particles, the difference in the refractive index from the antiglare layer is easily yielded, and the whitening of the film can thereby be prevented.

In the fifth aspect, a low-refractive index layer-forming coating liquid applied as an upper layer contains a first polymer whose substituent contains a molecular structure to decrease the refractive index of the whole polymer, and the first polymer is unevenly distributed in the low-refractive index layer by utilizing the spinodal decomposition. Thereby, since the first polymer can be disposed in the upper side than the surface of the antiglare layer formed after drying, the low-refractive index layer can be formed. Since the low-refractive index layer is formed of a polymer whose substituent contains a molecular structure to decrease the refractive index of the whole polymer, the difference in the refractive index from the antiglare layer is easily yielded, and the whitening of the film can thereby be prevented.

In this case, when the low-refractive index layer and the antiglare layer are formed by one-time simultaneous multilayer application, the productivity can be improved.

BRIEF DESCRIPTION OF DRAWINGS

FIG. 4 is a table showing the results of Examples in the first embodiment of the present invention.

FIGS. 7A-A and 7A-B are a table (No. 1) showing the results of Examples in the second embodiment of the present invention. FIG. 7A-B is an extension of the table shown in FIG. 7A-A.

FIGS. 7B-A and 7B-B are a table (No. 2) showing the results of Examples in the second embodiment of the present invention. FIG. 7B-B is an extension of the table shown in FIG. 7B-A.

DESCRIPTION OF EMBODIMENTS

Hereinafter, preferred embodiments of the production method of an antiglare film according to the present invention will be described by way of accompanying drawings. In the present embodiments, the description will be made by way of examples in which a lower layer and an upper layer are simultaneously applied as multiple layers, but the layers may be applied successively.

First Embodiment

Figure 1A:
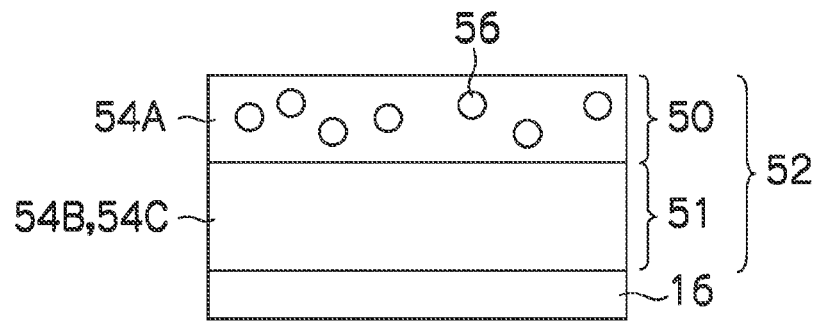
FIG. 1A is an explanatory diagram illustrating a coating step in one example of a production method of an antiglare film according to a first embodiment of the present invention.
Figure 1B:
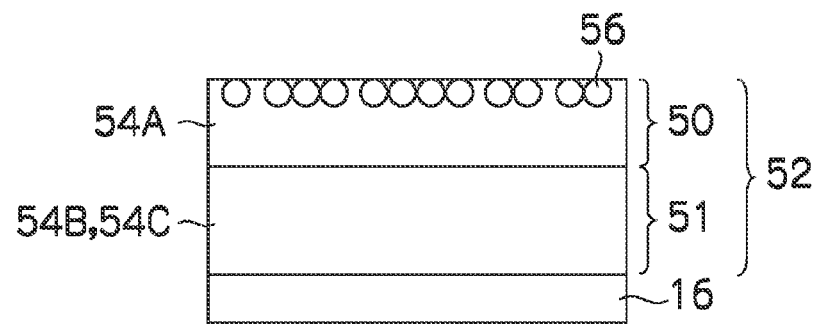
FIG. 1B is an explanatory diagram illustrating a particle movement step in one example of a production method of an antiglare film according to the first embodiment of the present invention.
Figure 1C:
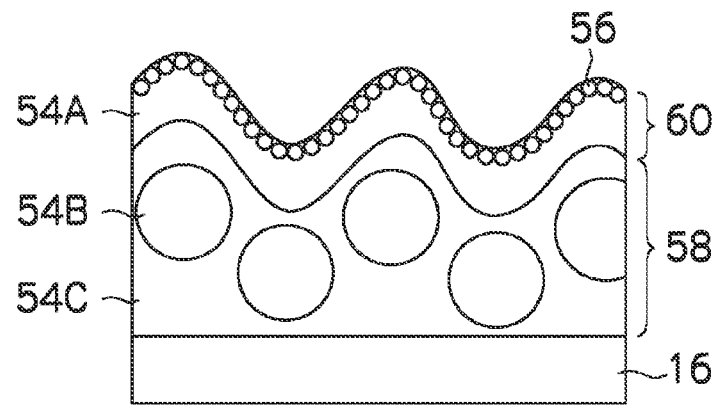
FIG. 1C is an explanatory diagram illustrating a low-refractive index layer and an antiglare layer obtained by one example of a production method of an antiglare film according to the first embodiment of the present invention.
Figure 2:
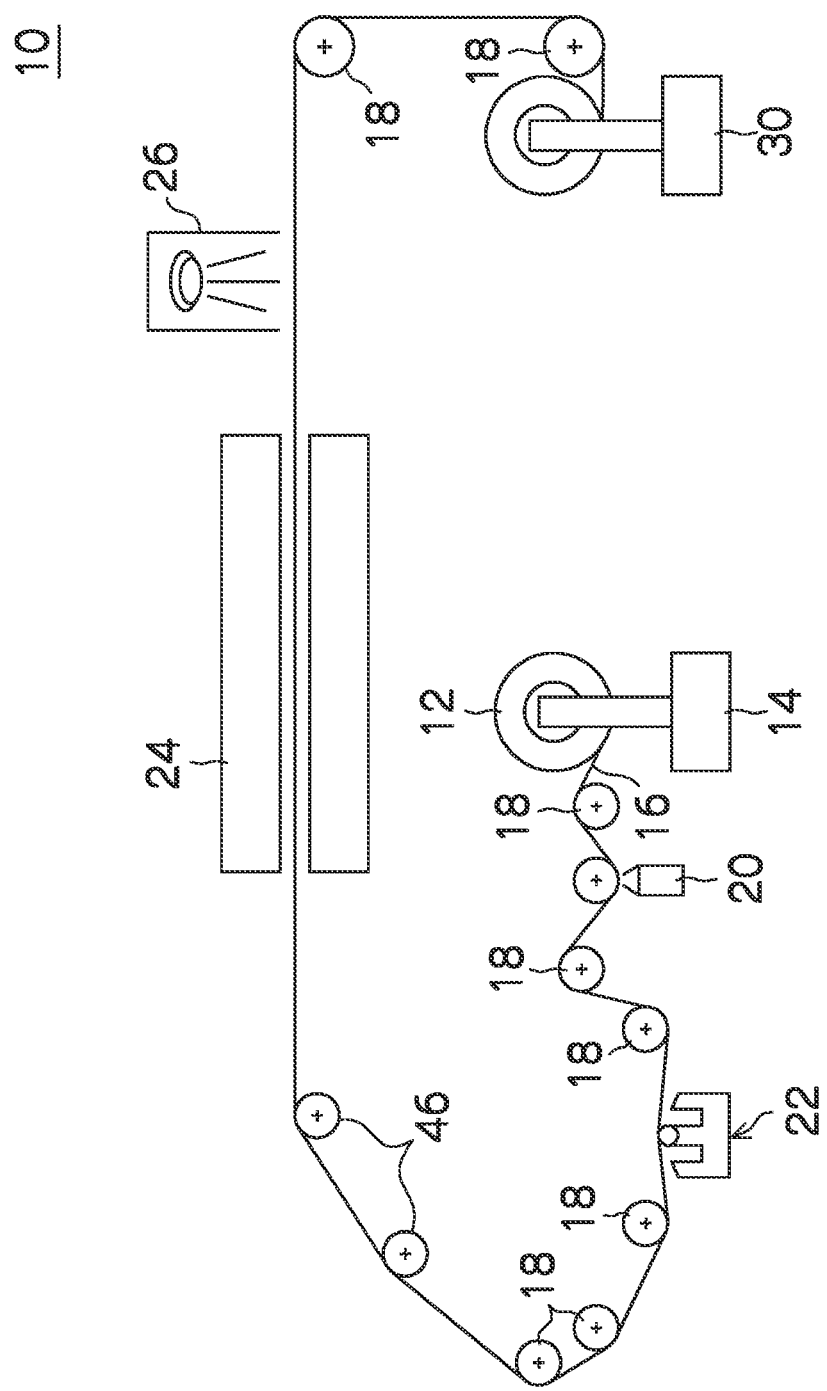
FIG. 2 is a schematic diagram illustrating one example of a production apparatus of an antiglare film.

FIGS. 1A to 1C are explanatory diagrams illustrating one example of a first embodiment of a production method of an antiglare film, and FIG. 2 is a schematic diagram illustrating one example of a production apparatus of an antiglare film. In the present embodiment, the description will be made by way of one example using a coating liquid containing two resins A and B, but the cases of two or more resins also have the same fundamental concept.

(Coating Liquid Preparation Step)

The production method of an antiglare film according to the present invention first involves preparing an antiglare layer-forming coating liquid in which two resins A and B incompatible with each other are dissolved in a solvent, and a low-refractive index layer-forming coating liquid in which a resin and a particle are dissolved in a solvent.

As the particle and the resin materials, materials described later can be used. A mixing method is not especially limited as long as being capable of dissolving resin materials in the solvent and dispersing the particle in the coating liquid.

[Antiglare Layer-Forming Coating Liquid]

An antiglare layer-forming coating liquid applied as a lower layer is prepared by dissolving at least two resin materials incompatible with each other in at least one solvent.

<Resin Materials>

The resin materials can be used with no special limitation as long as being at least two resin materials incompatible with each other, but thermoplastic resins are usually used. Examples of the thermoplastic resins include styrene resins, (meth)acrylic resins, organic acid vinyl ester resins, vinyl ether resins, halogen-containing resins, olefin resins (including alicyclic olefin resins), polycarbonate resins, polyester resins, polyamide resins, thermoplastic polyurethane resins, polysulfone resins (poly(ether sulfone), polysulfone and the like), polyphenylene ether resins (polymers of 2,6-xylenol, and the like), cellulose derivatives (cellulose esters and cellulose carbamates, cellulose ethers, and the like), silicone resins (polydimethylsiloxane, poly methylphenylsiloxane, and the like), and rubbers or elastomers (diene rubbers such as polybutadiene and polyisoprene, styrene-butadiene copolymers, acrylonitrile-butadiene copolymers, acrylic rubbers, urethane rubbers, silicone rubbers, and the like). These thermoplastic resins can be used in combination of two or more thereof.

The (meth)acrylic resins usable are homo- or copolymers of a (meth)acrylic monomer, copolymers of a (meth)acrylic monomer and a copolymerizable monomer, and the like. Examples of the (meth)acrylic monomer include (meth)acrylic acid; C1-10 alkyl (meth)acrylates such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate and 2-ethylhexyl (meth)acrylate; aryl (meth)acrylates such as phenyl (meth)acrylate; hydroxyalkyl (meth)acrylates such as hydroxyethyl (meth)acrylate and hydroxypropyl (meth)acrylate; glycidyl (meth)acrylate; N,N-dialkylaminoalkyl (meth)acrylates; (meth)acrylonitrile; and (meth)acrylates having an alicyclic hydrocarbon group such as tricyclodecane. Examples of the copolymerizable monomer include the styrenic monomer, a vinyl esoteric monomer, maleic anhydride, maleic acid and fumaric acid. These monomers may be used singly or in combination of two or more.

Examples of the (meth)acrylic resin include poly(meth)acrylate esters such as poly(methyl methacrylate), and methyl methacrylate-(meth)acrylic acid copolymers, methyl methacrylate-(meth)acrylate ester copolymers, methyl methacrylate-acrylate ester-(meth)acrylic acid copolymers, and (meth)acrylate ester-styrene copolymers (MS resins and the like). Preferable (meth)acrylic resins include C1-6 alkyl poly(meth)acrylates such as poly(methyl (meth)acrylate), especially methyl methacrylate resins containing methyl methacrylate as a main component (about 50 to 100% by weight, preferably about 70 to 100% by weight).

Preferable thermoplastic resins to be used are usually resins which are noncrystalline and soluble in an organic solvent (especially a common solvent capable of dissolving pluralities of polymers and curable compounds). Especially preferable are resins having high moldability, film-formability, transparency and weather-resistance, for example, styrene resins, (meth)acrylic resins, alicyclic olefin resins, polyester resins, cellulose derivatives (cellulose esters and the like). Cellulose derivatives are especially preferable as the thermoplastic resin. The cellulose derivatives are semisynthetic polymers, and have a very good phase separation property because the dissolution behavior is different from that of other resins and curing agents.

From the viewpoint of scratch resistance after curing, for example, as one polymer out of polymers incompatible with each other, a polymer having a functional group participating in a curing reaction (a functional group reactable with a curing agent) may be used. Such functional groups include condensable or reactive functional groups (for example, a hydroxyl group, an acid anhydride group, a carboxyl group, an amino group or an imino group, an epoxy group, a glycidyl group and an isocyanate group), and polymerizable functional groups (for example, C2-6 alkenyl groups such as vinyl, propenyl, isopropenyl and butenyl and allyl, C2-6 alkynyl groups such as ethynyl, propynyl and butynyl, C2-6 alkenylidene groups such as vinylidene, or functional groups ((meth)acryloyl group or the like) having such polymerizable functional groups.

The glass transition temperature of the polymer can be selected, for example, from the range of −50° C. to 230° C., and preferably about 0 to 200° C. The weight average molecular weight of the polymer can be selected, for example, from the range of 1,000,000 or less, and preferably about 1,000 to 500,000.

The combination of the first polymer and the second polymer is not especially limited, but is preferably a combination of two polymers incompatible (immiscible) with each other and easily phase-separating at near a processing temperature.

For example, in the case where the first polymer is a cellulose derivative (for example, cellulose esters such as a cellulose acetate propionate), the second polymer may be a styrene resin (a polystyrene, a styrene-acrylonitrile copolymer or the like), a (meth)acrylic resin, an alicyclic olefin resin (a polymer using norbornene as a monomer, or the like), a polycarbonate resin, or a polyester resin (a poly(C2-4 alkylene acrylate) copolyester described above, or the like).

The resin materials may be ones obtained by adding a curable compound to at least two resin materials described above and curing the mixture. The curable compounds usable are compounds having a functional group to react by heat rays, active energy rays (ultraviolet rays, electron beams or the like) or the like, and various types of curable compounds capable of forming resins (particularly cured resins or crosslinked resins) through curing or crosslinking by heat or active energy rays or the like.

Examples of the curable compounds include thermosetting compounds or resins [low-molecular weight compounds having an epoxy group, an isocyanate group, an alkoxy silyl group, a silanol group, or a polymerizable group (a vinyl group, an ally group, a (meth)acryloyl group, or the like) (or prepolymers, for example, low-molecular weight resins such as epoxy resins, unsaturated polyester resins, urethane resins and silicone resins or the like)], and photocurable compounds capable of curing by active rays (ultraviolet rays or the like) (ultraviolet-curable compounds such as photocurable monomers, oligomers or prepolymers or the like); and the photocurable compound may be an EB (electron beam)-curable compound or the like. A photocurable compound such as a photocurable monomer or oligomer and a photocurable resin which may have a low molecular weight is referred to simply as "photocurable resin" in some cases. The curable compound may be used singly or in combination of two or more.

The photocurable compounds usually have a photocurable group, for example, a polymerizable group (a vinyl group, an ally group, a (meth)acryloyl group or the like) or a photosensitive group (a cinnamoyl group or the like), and are especially preferably photocurable compounds having a polymerizable group (for example, monomers, or oligomers (or resins, especially low-molecular weight resins)).

Among the photocurable compounds having a polymerizable group(s), examples of monomers include monofunctional monomers [(meth)acrylic monomers such as (meth)acrylate ester, for example, alkyl (meth)acrylates (C1-6 alkyl (meth)acrylates such as methyl (meth)acrylate), cycloalkyl (meth)acrylates, (meth)acrylates having a cross-linked cyclic hydrocarbon group (isobornyl (meth)acrylate, adamantyl (meth)acrylate and the like), glycidyl (meth)acrylate; and vinyl esters such as vinyl acetate, and vinyl monomers such as vinyl pyrrolidone], and polyfunctional monomers having at least two polymerizable unsaturated bonds [alkylene glycol di(meth)acrylates such as ethylene glycol di(meth)acrylate, propylene glycol di(meth)acrylate, butanediol di(meth)acrylate, neopentyl glycol di(meth)acrylate and hexanediol di(meth)acrylate; (poly)oxyalkylene glycol di(meth)acrylates such as diethylene glycol di(meth)acrylate, dipropylene glycol di(meth)acrylate and polyoxytetramethylene glycol di(meth)acrylate; di(meth)acrylates having a cross-linked cyclic hydrocarbon group such as tricyclodecanedimethanol di(meth)acrylate and adamantane di(meth)acrylate; and polyfunctional monomers having about 3 to 6 polymerizable unsaturated bonds such as trimethylolpropane tri(meth)acrylate, trimethylolethane tri(meth)acrylate, pentaerythritol tri (meth)acrylate, pentaerythritol tetra(meth)acrylate and dipentaerythritol penta(meth)acrylate].

The curable compound may be used in combination with a curing agent, depending on the kind. For example, a photocurable compound may be used in combination with a photopolymerization initiator.

Examples of the photopolymerization initiator usable are acetophenones or propiophenones, benzyls, benzoins, benzophenones, thioxanthones and acylphosphine oxides. The content of a photopolymerization initiator can be about 0.1 to 20 parts by weight with respect to a curable compound.

The phase separation property of a plurality of polymers can be simply distinguished by visually confirming whether remaining solid contents become cloudy in a process of preparing a homogeneous solution by using respective good solvents for both components and gradually evaporating the solvents.

The plurality of these polymers form a bicontinuous phase structure along with the progress of the phase separation; and as the phase separation further progresses, the continuous phases become discontinuous by the own surface tensions of the continuous phases to make a liquid-drop phase structure (a sea-island structure having independent phases globular, spherical, discotic, elliptical or otherwise).

Control of these phase separations can be carried out by regulating the kinds and combination and mass ratios of polymers to be used. The kinds of polymers may be any ones as long as being incompatible with each other; and when an antiglare layer is formed, a solution is preferably used in which the two or more polymers incompatible with each other are dissolved in a common good solvent. The mass ratios of the polymers are satisfied if a triangle phase diagram of two incompatible polymers and a common solvent of the polymers is first fabricated, and the solution is controlled to be subjected to a drying process passing through a line (spinodal line) causing the spinodal decomposition. Such a spinodal line can be determined based on, for example, a literature (CORNELL UNIVERSITY PRESS, "Scaling Concepts in Polymer Physics", p 94-96).

<Solvent>

The phase separation according to the present embodiment can be carried out by evaporating a solvent in a coating liquid. That is, the solvent not only dissolves polymers incompatible (immiscible) with each other, but has a function to regulate the drying rate.

A solvent to be used can be selected depending on the kinds and dissolvabilities of polymers, curable compounds and the like to be used; and in the case of a mixed solvent, it suffices if at least one solvent can homogeneously dissolve solid contents (a plurality of polymers, a curable compound, a reaction initiator, and other additives). Examples of such a solvent include ketones (acetone, methyl ethyl ketone, methyl isobutyl ketone, cyclohexanone, and the like), ethers (dioxane, tetrahydrofuran, and the like), aliphatic hydrocarbons (hexane and the like), alicyclic hydrocarbons (cyclohexane and the like), aromatic hydrocarbons (toluene, xylene, and the like), halocarbons (dichloromethane, dichloroethane, and the like), esters (methyl acetate, ethyl acetate, butyl acetate, and the like), water, and alcohols (ethanol, isopropanol, butanol, cyclohexanol, and the like), cellosolves (methyl cellosolve, ethylcellosolve, and the like), cellosolve acetates, sulfoxides (dimethyl sulfoxide and the like), and amides (dimethylformamide, dimethylacetamide, and the like). These solvents may be used singly or in combination of two or more.

In the case of applying a coating liquid on a support, a solvent may be selected which does not dissolve, erode or swell the support, depending on the kind of the support. For example, in the case of using a triacetyl cellulose film as a support, as a solvent for a coating liquid, for example, tetrahydrofuran, methyl ethyl ketone, isopropanol, toluene or the like can be preferably used.

The viscosity of a coating liquid may be about 1 to 50 cP.

[Low-Refractive Index Layer-Forming Coating Liquid]

A low-refractive index layer-forming coating liquid applied as an upper layer is prepared by dissolving a resin material and a hydrophobic particle in a solvent.

<Particles>

Particles can be used with no especial limitation as long as being capable of more decreasing the refractive index than a surrounding resin material, but for example, hollow silica particles or fluorine-containing resin particles can be used, and particularly hollow silica particles can be preferably used.

The particle is surface-modified with hydrophobicity imparted. Imparting the hydrophobicity allows easy movement of the particle to the gas-liquid interface of a coating layer after the application of the coating liquid, and easy formation of a low-refractive index layer.

Methods for imparting the hydrophobicity include methods of (1) surface modification with a coupling agent, (2) hydrophobizing treatment with a low-molecular organic compound, (3) surface-coating hydrophobizing treatment with a polymer compound, and (4) grafting of a hydrophobic polymer. Hereinafter, specific methods will be described.

(1) Surface Modification with a Coupling Agent

The surface modification with a coupling agent is a method in which particles are dispersed in a solution in which a coupling agent is dissolved in an organic solvent, and thereafter, the organic solvent is completely evaporated and removed to treat (coat) and hydrophobize the particles with the coupling agent. Although various types of coupling agents are usable, those preferably include silane coupling agents having an alkyl chain and silane coupling agents containing a fluorine atom (fluorine-based silane coupling agent).

Specific examples of the silane coupling agent having an alkyl chain include methyltriethoxysilane, trimethyltrichlorosilane, ethyltriethoxysilane, ethyltrichlorosilane, phenyltriethoxysilane, phenyltrichlorosilane, dimethyldiethoxysilane, dimethyldichlorosilane, 3-glycidoxypropyltrimethoxysilane, 3-glycidoxypropylmethyldimethoxysilane, 2-(3,4-epoxycyclohexyl)ethyltrimethoxysilane, 3-aminopropyltriethoxysilane, 3-aminopropyltrimethoxysilane, N-(2-aminoethyl)-3-aminopropylmethyldiethoxysilane, 3-mercaptopropyltrimethoxysilane, vinyltrimethoxysilane, vinyltriethoxysilane, vinyltris(2-methoxyethoxy)silane and 3-methacryloxypropyltrimethoxysilane.

Specific examples of the fluorine-based silane coupling agent include fluoroalkylsilane coupling agents (trade name: TSL8262, TSL8257, TSL8233, TSL8231, and the like), made by GE Toshiba Silicones Ltd., and alkoxysilanes having a perfluoropolyether group. Coupling agents may be used which have an element other than silicon in the range not influencing the refractive index, and specific examples thereof include titanate coupling agents commercially available from Ajinomoto Co., Inc. (trade name: Plenact KR-TTS, KR-46B, KR-55, KR-41B, KR-38S, KR-138S, KR-238S, KR-338X, KR-44, KR-9SA, KR-ET, and the like); and metal alkoxides such as tetramethoxytitanium, tetraethoxytitanium, tetraisopropoxytitanium, tetra-n-propoxytitanium, tetra-n-butoxytitanium, tetra-sec-butoxytitanium and tetra-tert-butoxytitanium.

(2) Hydrophobizing Treatment with Low-Molecular Organic Compound

The hydrophobizing treatment with a low-molecular organic compound is a method in which particles are dispersed in a solution in which a low-molecular organic compound is dissolved in an organic solvent, and thereafter, the organic solvent is completely evaporated and removed to treat (coat) and hydrophobize the particles with the low-molecular organic compound. The low-molecular organic compound includes ones having a molecular weight (number-average molecular weight in terms of polystyrene equivalent) of 5,000 or less, and preferably 3,000 or less. Specific examples thereof include low-molecular organic carboxylic acids such as stearic acid, lauric acid, oleic acid, linoleic acid and linolenic acid, and low-molecular organic amines.

(3) Surface-Coating Treatment with a Polymer Compound

The surface-coating treatment with a polymer compound is a method in which at least a part of the particle surface is coated with a polymer compound. Specific methods usable are means of making a monomer selectively adsorbed on a particle surface and thereafter polymerizing the monomer, an emulsion polymerization method, microcapsulating method, a dispersion polymerization method, a suspension polymerization method, a seed polymerization method, a spray dry method, a cooling granulation method, a method using a supercritical fluid, a heteroaggregation method, a dry microparticle aggregation method, a phase separation method (coacervation method), an interfacial polymerization method, a in-liquid dry method (interfacial sedimentation method), an orifice method, an interfacial inorganic reaction method, an ultrasonic method and the like in the presence of particles. By using one of the above-mentioned methods, at least a part of the surface can be coated with a desired polymer compound.

The polymer compound has a molecular weight (number-average molecular weight in terms of polystyrene equivalent) of 5,000 or more, and preferably 10,000 or more, and a polymer compound having a higher hydrophobicity is preferably used. Specific examples of such a polymer compound include polyolefin resins, polystyrene, resins containing a halogen such as a fluorine atom, acrylic resins, nitrogen-containing resins, polyvinyl ethers, polyamide resins, polyester resins, polycarbonate resins, silicon resins, PPO resins, phenol resins, xylene resins, amino resins, acetal resins, polyether resins, epoxy resins, penton resins, natural rubber, synthetic rubber singly, and/or composites (blends or copolymers thereof), and polymers of the above-mentioned coupling agents, or organic-inorganic hybrid-type polymer compounds. Specific examples of the monomers of the organic-inorganic hybrid polymer include organometal compounds such as alkoxysilanes, and is used in combination with a monomer or a polymer exemplified in (4) described below. Specific examples of the preferable organic-inorganic hybrid polymer include commercially available Compoceran and Ureano (trade names, made by Arakawa Chemical Industries, Ltd.).

(4) Method for Grafting a Hydrophobic Polymer

This method may be divided into the following three methods.

(4-1) Method for Capturing a Growing Terminal of a Polymer by a Particle

Since a hydrophilic group present on the particle surface (for example, a hydroxyl group (—OH) present on the surface of silica) has a function of capturing an active species such as a radical, by making such a particle present and carrying out the polymerization reaction of a polyfunctional monomer or oligomer, or by adding an inorganic ultrafine particle to a polymerization system of a polyfunctional monomer or oligomer, the monomer, oligomer or polymer having polymerizable functional groups is bonded to the fine particle surface to make the particle hydrophobic.

(4-2) Method for Initiating the Polymerization Reaction from the Surface of a Particle This method is one in which a polymerization-initiating active species such as a radical polymerization initiator is formed in advance on the surface of a particle (for example, silica), and a polymer is grown from the particle surface by using a polyfunctional monomer or oligomer. According to the method, a high-molecular weight polymerization-reactive polymer chain can easily be obtained.

(4-3) Method for Bonding Hydrophilic Groups on the Fine Particle Surface and a Polymer Having Reactive Groups This method is one using a polymer having two or more functional reactive groups, in which a hydroxyl group of a particle (for example, a hydroxyl group on a silica surface) and a reactive group of a polymer terminal are directly bonded, or another reactive group is bonded to a reactive group of a polymer terminal and/or a hydrophilic group of a fine particle, and the both are then bonded.

This method can be applied to various types of polymers, and requires relatively simple operations and gives a good bonding efficiency. Since the method utilizes the dehydration polycondensation reaction between the hydroxyl group on the fine particle surface and the polymer having a reactive group, the method needs to disperse the fine particles (for example, silica fine particle) in the polymer and the solution, and to heat the dispersion at a suitable temperature for a suitable time. For example, in the case of silica, depending on the amount of a polymer, in general, the heating is preferably carried out at 80° C. or higher for 3 or more hours.

Among these methods for imparting hydrophobicity, imparting hydrophobicity by using a silane coupling agent is suitably used. Use of a silane coupling agent can impart hydrophobicity by a simple operation effectively.

The size of a particle is preferably 10 nm or more and 50 nm or less, more preferably 15 nm or more and 40 nm or less, and still more preferably 20 nm or more and 30 nm or less. By making the size of a particle in the range described above, since the particle can be made to be easily moved to the gas-liquid interface in the particle movement step, a low-refractive index layer can be made to be easily formed.

<Resin Material>

A resin material to be used is usually a thermoplastic resin. Examples of the thermoplastic resin include styrene resins, (meth)acrylic resins, organic acid vinyl ester resins, vinyl ether resins, halogen-containing resins, olefin resins (including alicyclic olefin resins), polycarbonate resins, polyester resins, polyamide resins, thermoplastic polyurethane resins, polysulfone resins (polyether sulfone, polysulfone and the like), polyphenylene ether resins (polymers of 2,6-xylenol, and the like), cellulose derivatives (cellulose esters and cellulose carbamates, cellulose ethers, and the like), silicone resins (polydimethylsiloxane, poly methylphenylsiloxane, and the like), and rubbers or elastomers (diene rubbers such as polybutadiene and polyisoprene, styrene-butadiene copolymers, acrylonitrile-butadiene copolymers, acrylic rubbers, urethane rubbers, silicone rubbers, and the like).

The (meth)acrylic resins usable are homo- or copolymers of a (meth)acrylic monomer, copolymers of a (meth)acrylic monomer and a copolymerizable monomer, and the like. Examples of the (meth)acrylic monomer include (meth)acrylic acid; C1-10 alkyl (meth)acrylates such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate and 2-ethylhexyl (meth)acrylate; aryl (meth)acrylates such as phenyl (meth)acrylate; hydroxyalkyl (meth)acrylates such as hydroxyethyl (meth)acrylate and hydroxypropyl (meth)acrylate; glycidyl (meth)acrylate; N,N-dialkylaminoalkyl (meth)acrylates; (meth)acrylonitrile; and (meth)acrylates having an alicyclic hydrocarbon group such as tricyclodecane. Examples of the copolymerizable monomer include the styrenic monomer, a vinyl esoteric monomer, maleic anhydride, maleic acid and fumaric acid. These monomers may be used singly or in combination of two or more.

Examples of the (meth)acrylic resin include poly(meth)acrylate esters such as poly(methyl methacrylate), and methyl methacrylate-(meth)acrylic acid copolymers, methyl methacrylate-(meth)acrylate ester copolymers, methyl methacrylate-acrylate ester-(meth)acrylic acid copolymers, and (meth)acrylate ester-styrene copolymers (MS resins and the like). Preferable (meth)acrylic resins include C1-6 alkyl poly (meth)acrylate such as poly(methyl (meth)acrylate), especially methyl methacrylate resins containing methyl methacrylate as a main component (about 50 to 100% by weight, preferably about 70 to 100% by weight).

Preferable thermoplastic resins to be used are usually resins which are noncrystalline and soluble in an organic solvent (especially a common solvent capable of dissolving pluralities of polymers and curable compounds). Especially preferable are resins having high moldability, film-formability, transparency and weather-resistance, for example, styrene resins, (meth)acrylic resins, alicyclic olefin resins, polyester resins, cellulose derivatives (cellulose esters and the like), and the like. Cellulose derivatives are especially preferable as the thermoplastic resin. The cellulose derivatives are semisynthetic polymers, and have a very good phase separation property because the dissolution behavior is different from that of other resins and curing agents.

<Solvent>

The same solvent as that of the antiglare layer-forming coating liquid can be used. It does not matter if a solvent is different from a solvent of the antiglare layer-forming coating liquid.

(Coating Step)

Then, as shown in FIG. 1A, a low-refractive index layer-forming coating liquid 50 containing a resin 54A and particles 56 as an upper layer, and an antiglare layer-forming coating liquid 51 containing resins 54B and 54C as a lower layer are applied on a support 16 to form a coating layer 52. In the coating step, in a production apparatus shown in FIG. 2, the support 16 (including some functional layer already formed) is fed from a film roll 12 by a feed machine 14. The running rate of the support 16 can be made, for example, 0.1 to 1.5 m/s.

Figure 3:
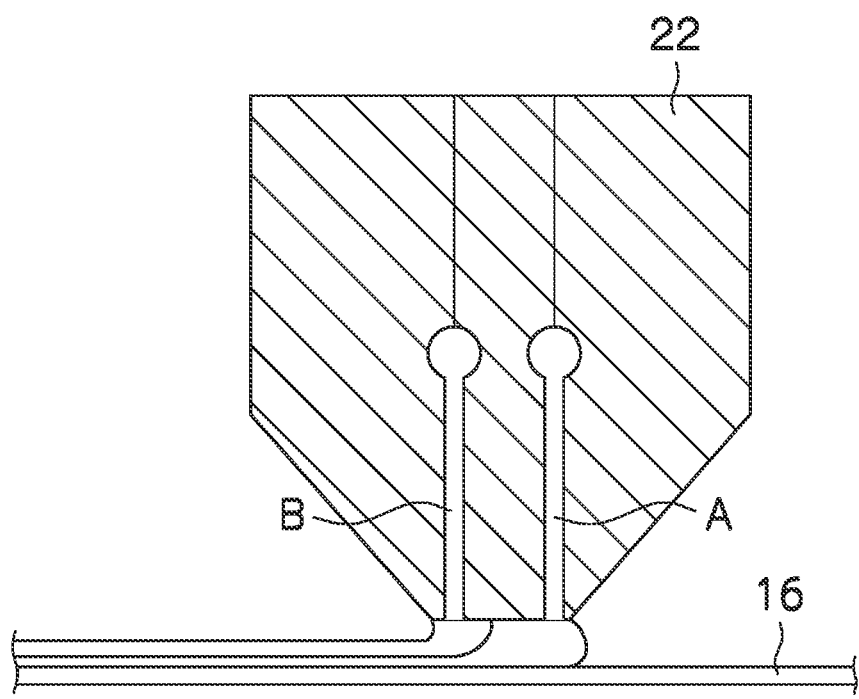
FIG. 3 is an illustrative diagram illustrating one example of a coating device.

The support 16 is guided by guide rollers 18 and fed in a dust eliminator 20. The dust eliminator 20 is so configured that dusts attached to the surface of the support 16 can be removed. A coating device 22 as coating means is installed downstream of the dust eliminator 20, and is so configured that the coating liquids can be simultaneously applied on the support 16 passed round a backup roller. The coating device 22 is composed of at least two slot dies A and B facing the continuous support as shown in FIG. 3; and the antiglare layer-forming coating liquid is applied from the slot die A on the upstream side in the running direction of the support, and the low-refractive index layer-forming coating liquid is applied from the slot die B on the downstream side to form a low-refractive index layer-forming coated film on an antiglare layer-forming coated film, and the coating layer 52 is thus formed on the support 16. The support 16 may be held on the backup roller.

The slot dies have a following form.

(1) The slot dies each have a manifold installed inside a main body, and a slot extending from the manifold to the leading end part of the slot die. The leading end part of the slot dies is formed in a tapering-off shape, and the leading end is called a lip land. The lip land on the upstream side in the support conveyance direction with respect to the slots is referred to as an upstream-side lip land; and that on the downstream side, a downstream-side lip land.

(2) The length of the upstream-side lip land part is generally used in the range of 100 to 1,000 μm, but is not especially limited.

(3) The length of the downstream-side lip land part is used in the range of 30 to 500 μm.

(4) The distance between the each lip land part and the support is preferably about 10 to 200 μm. The distance between the upstream-side lip land part and the support may be shorter than the distance between the downstream-side lip land part and the support, and this structure is called an overbite structure. The distance between the upstream-side lip land part and the downstream-side lip land part in the normal line direction is used in the range of about 0 to 200 μm.

(5) As an improvement measure of the strength and the surface condition of the lip leading end, a part of the slot die including at least the leading end thereof may be made of a superhard material.

(6) The manifold is a liquid pool to make a liquid flow in the slot as a uniformly widened flow in the width directions, and extends in the web width directions.

(7) A method for feeding the liquid to the manifold may be any method as long as being capable of properly feeding the liquid, and the feed may be from a side or the center thereof. The shape of the manifold is not limited to a nearly circular shape, and may be a semicircular, rectangular including trapezoidal shape, or a shape similar thereto.

(8) The length of the slot has a suitable length depending on a coating liquid to be used. The clearance is used in the range of 50 to 1,000 μm.

(9) A pressure-reducing chamber to stabilize beads may be installed on the upstream side of the slot dies A and B.

(10) The shapes of the slot die A and the slot die B may be different as long as meeting the above-mentioned (1) to (9).

<Support>

An antiglare film is made by forming an antiglare layer on a support. The light transmittance of the support to be used is preferably 80% or more, and more preferably 86% or more. The haze of the transparent support is preferably 2.0% or less, and more preferably 1.0% or less. The refractive index of the support is preferably 1.4 to 1.7. Further, use of a plastic film is preferable. Examples of the plastic film material include cellulose esters, polyamides, polycarbonates, polyesters (for example, polyethylene terephthalate and polyethylenenaphthalate), polystyrenes, polyolefins, polysulfones, polyether sulfones, polyarylates, polyetherimides, polymethyl methacrylate and polyether ketones.

(Particle Movement Step)

While the coating layer 52 applied on the support 16 is conveyed to a drying zone 24, the particles 56 move to the gas-liquid interface, and is unevenly distributed at the gas-liquid interface in the coating layer 52 as shown in FIG. 1B. In the present invention, in the particle movement step, making the particles move to the gas-liquid interface is important. In the present invention, by imparting hydrophobicity to the particles, the movement of the particles is promoted. Therefore, if a ratio (mass ratio) of the particles to the solvent in the low-refractive index layer-forming coating liquid is represented by r [-], a time (time period) until the solvent decreases to half is represented by t [s], and an initial film thickness of the upper layer in the coating step is represented by d [m], the multiplication of 1/r and t and d preferably satisfies $6 \times 10^{-2}$ or more, and more preferably $6.15 \times 10^{-2}$ or more. By making the drying rate in the range described above, the time for the particle movement step can be taken sufficiently. The smaller the ratio r of the particles to the solvent in the low-refractive index layer-forming coating liquid, the more easily the particles disperse in the low-refractive index layer-forming coating liquid after coating, and the more hardly the particles are involved in the antiglare layer due to the phase separation. By contrast, the larger the ratio r, in the particle movement step, the more hardly the particles disperse in the low-refractive index layer-forming coating liquid after coating, and the more the proportion of particles involved in the antiglare layer due to the phase separation. If the time t [s] until the solvent decreases to half is long, the probability that the particles present at positions far from the gas-liquid interface in the upper layer at an instant of coating reach the gas-liquid interface becomes high; and by contrast, if the time is short, the probability that the particles reach the gas-liquid interface becomes low. Then, the thicker the initial film thickness d [m] of the upper layer in the coating step, the more the particles can be moved to the upper layer, and the amount of the particles involved in the antiglare layer in the drying step can be reduced. By contrast, the thinner the film thickness, the larger the proportion of the particles in the upper layer settle in the lower layer.

The ratio r [-] of the particles to the solvent is preferably $2.47 \times 10^{-3}$ or less, and more preferably $2.44 \times 10^{-3}$ or less. The time t [s] until the solvent decreases to half is preferably 1.5 s or more, and more preferably 3 s or more. The initial film thickness is preferably $3.50 \times 10^{-5}$ m or more, and more preferably $5.00 \times 10^{-5}$ m or more.

In the particle movement step, 80% or more of the whole particles 56 is preferably contained at the gas-liquid interface of the coating layer 52, that is, in the low-refractive index layer 60 after drying. Especially preferably 90% or more is contained, and more preferably 95% or more thereof is contained. In the case where the amount of the particles 56 contained in the low-refractive index layer 60 is not in the range described above, since a difference in refractive index can hardly be yielded between the antiglare layer 58 and the low-refractive index layer 60, the antireflection function becomes insufficient.

(Drying Step)

The support 16 having the coating layer 52 in which the particles 56 have been moved to the gas-liquid interface in the particle movement step is conveyed to a drying zone 24. In the drying zone 24, the solvent is evaporated and the resins 54A and 54B are phase-separated to form convexo-concave as shown in FIG. 1C. The drying zone 24 is not especially limited, but usable ones are a hot air heating apparatus (for example, a heat treatment apparatus described in Japanese Patent Application Laid-Open No. 2001-314799, and the like), a heater heating apparatus, and the like.

As a curing step of the coating layer in the downstream of the drying step, the coating layer is cured or crosslinked by heat rays or an active energy source (ultraviolet rays, electron beams or the like). The curing method can be selected depending on the kind of a curable compound, but for example, an ultraviolet irradiation apparatus 26 is used. The ultraviolet irradiation can form desired curing or crosslinking.

Depending on the material, a heat treatment zone for heat curing is installed to carry out desired curing or crosslinking in some cases. Alternatively, after the support 16 on which the coating layer is formed is taken up, oven heating may be carried out as another step, or a heat treatment after transportation may be carried out, in some cases. And, taking-up of the support 16 on which the antiglare layer and the low-refractive index layer are formed is carried out by a takeup machine 30 installed in the downstream of the curing step.

It is preferable that the selection of the solvent, the regulation of the drying rate of the solvent and the surface-modification of the particles are carried out so that after 70% or more of the particles in the coating liquid are moved within 10% of the film thickness of the coating layer 52 to the gas-liquid interface side in the particle movement step, the concentrations of the resin materials in the coating liquid forming the coating layer exceed critical solid-content concentrations.

In order to carrying out the drying under such a condition, the solvent to be used is one having a boiling point of 60° C. or higher; the drying rate of the solvent is 5.0 g/m$^2$·sec or less, and preferably 1.0 g/m$^2$·sec or less; and the surface-modification of the particles are carried out using a silane coupling agent containing 3 or more fluorine atoms, for example, 3,3,3-trifluoropropylmethyldichlorosilane.

<Other Layers>

An antiglare film produced by the production method of an antiglare film according to the present invention may be provided further with a hard coat layer, a forward scattering layer, a primer layer, an antistatic layer, an undercoat layer, a protecting layer and the like.

(Hard Coat Layer)

A hard coat layer is provided on the support in order to impart physical strength to an antiglare film. The hard coat layer is preferably formed by a crosslinking reaction or a polymerization reaction of a curable compound by light and/or heat.

The curable functional group is preferably a photopolymerizable functional group, and an organometallic compound containing a hydrolysable functional group is preferably an organic alkoxysilyl compound. Specific examples of these compounds include those subjected to a treatment of the particle surface with a surface treating agent (for example, silane coupling agent: Japanese Patent Application Laid-Open Nos. 11-295503, 11-153703 and 2000-9908, anionic compounds or organometallic coupling agents: Japanese Patent Application Laid-Open No. 2001-310432 and the like), a core-shell structure having a high-refractive index particle as a core (Japanese Patent Application Laid-Open No. 2001-166104 and the like), or use of a specific dispersant (for example, Japanese Patent Application Laid-Open No. 11-153703, U.S. Pat. No. 6,210,858B1, Japanese Patent Application Laid-Open No. 2002-2776069 and the like). Examples of a specific structural composition of the hard coat layer include ones described in Japanese Patent Application Laid-Open Nos. 2002-144913 and 2000-9908, and WO 0/46617.

The film thickness of a hard coat layer is preferably 0.2 to 10 μm, and more preferably 0.5 to 7 μm. The strength of a hard coat layer is preferably H or more, more preferably 2H or more, and most preferably 3H or more, in the pencil hardness test according to JIS K5400. In a Taper test according to JIS K5400, a less abrasion amount of a test piece after the test is better.

(Forward Scattering Layer)

A forward scattering layer is provided in order to impart a viewing angle-improving effect if the view angle is inclined in vertical and horizontal directions when applied to liquid crystal displays. By dispersing fine particles having a different refractive index in the hard coat layer, a forward scattering layer can serve also as a hard coat function. Examples thereof include Japanese Patent Application Laid-Open No. 11-38208 in which the forward scattering coefficient is specified, Japanese Patent Application Laid-Open No. 2000-199809 in which a relative refractive index between a transparent resin and a fine particle is in a specific range, and Japanese Patent Application Laid-Open No. 2002-107523 in which the haze value is prescribed to be 40% or higher.

Second Embodiment

Then, a second embodiment according to the present invention will be described.

Figure 5A:
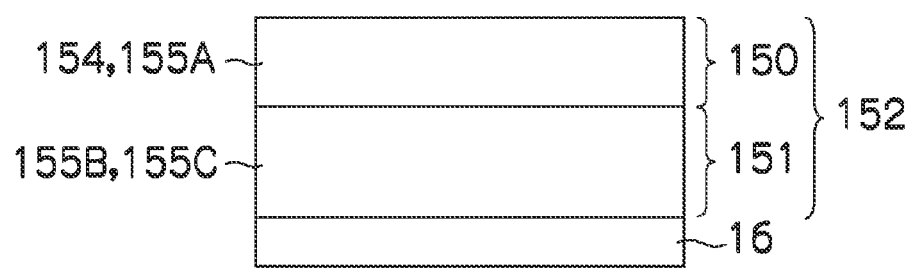
FIG. 5A is an explanatory diagram illustrating a coating step in one example of a production method of an antiglare film according to a second embodiment of the present invention.
Figure 5B:
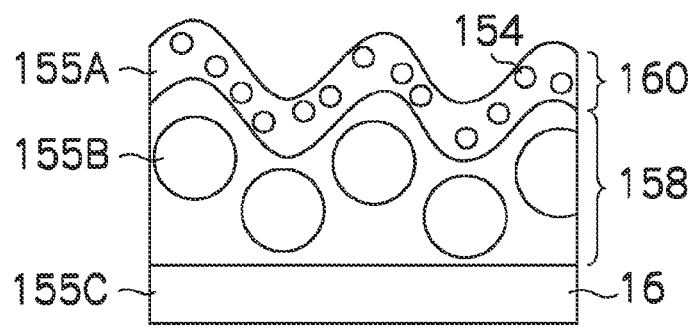
FIG. 5B is an explanatory diagram illustrating a low-refractive index layer and an antiglare layer obtained by one example of a production method of an antiglare film according to the second embodiment of the present invention.

FIGS. 5A and 5B are explanatory diagrams illustrating one example of a production method of an antiglare film. Explanatory diagrams of a production apparatus (FIG. 2) and a coating device (FIG. 3) of the antiglare film are the same as those used in the first embodiment.

In the present embodiment, the description will be made by way of one example using a coating liquid comprising a first polymer whose substituent contains a molecular structure to decrease the refractive index of the whole polymer, and three types of resins A, B and C whose substituents contain no molecular structure to decrease the refractive index of the whole polymers, but the case of three or more resins whose substituents contain no molecular structure to decrease the refractive index of the whole polymers has also the same basic concept.

(Coating Liquid Preparation Step)

The production method of an antiglare film according to the present invention first involves preparing an antiglare layer-forming coating liquid in which two resins B and C incompatible (immiscible) with each other are dissolved in a solvent, and a low-refractive index layer-forming coating liquid in which a first polymer whose substituent contains a molecular structure to decrease the refractive index of the whole polymer and a resin A, which is incompatible with the first polymer, are dissolved in a solvent. The mixing method of the each coating liquid is not especially limited as long as the resins (resin materials) can be dissolved in the solvents.

[Antiglare Layer-Forming Coating Liquid]

An antiglare layer-forming coating liquid applied as a lower layer is prepared by dissolving at least two resin materials incompatible with each other in at least one solvent.

<Resin Materials>

Resin materials are the same as those described in the first embodiment, so the description is omitted.

The combination of two polymers is not especially limited, but a combination of two polymers which are incompatible with each other at near the processing temperature, and easily phase separate is preferable.

<Solvent>

A solvent is the same as that described in the first embodiment, so the description is omitted.

The viscosity of the coating liquid may be about 1 to 50 cP.

[Low-Refractive Index Layer-Forming Coating Liquid]

A low-refractive index layer-forming coating liquid applied as an upper layer is prepared by dissolving a first polymer whose substituent contains a molecular structure to decrease the refractive index of the whole polymer, and a resin material to form a phase separation structure with the first polymer in a solvent.

<Polymer Whose Substituent Contains a Molecular Structure to Decrease the Refractive Index of the Whole Polymer>

By making the low-refractive index layer-forming coating liquid contain the first polymer whose substituent contains a molecular structure to decrease the refractive index of the whole polymer, the first polymer can be unevenly distributed in the low-refractive index layer. Thereby, a difference in refractive index can easily be yielded between the antiglare layer and the low-refractive index layer.

The first polymer usable is not especially limited as long as being capable of more decreasing the refractive index than surrounding resin materials. For example, polymers having a molecular structure containing a fluorine molecule can be used. Specific examples thereof include a polymer of a resin material which is contained in the antiglare layer-forming coating liquid and made to contain fluorine. Fluorine-containing olefin resins, fluorine-containing acrylic resins, fluorine-containing alkylsilane compounds and the like can be used as such a resin material. Specifically, copolymers of 2,2,2-trifluoroethyl acrylate, perfluorooctylethyl acrylate, 3,3,3-trifluoropropylmethyldichlorosilane, tridecafluoro-1,1,2,2-tetrahydroxyldimethylchlorosilane, heptadecafluoro-1,1,2,2-tetra-hydroxyldimethylchlorosilane can be used. A monomer containing no molecular structure to decrease the refractive index may be contained in the polymer.

In this case, it is preferable that the whole of the first polymer and the resin materials in the low-refractive index layer-forming coating liquid contains not less than 10% of a monomer having a molecular structure to decrease the refractive index. Although making much of the first polymer contained can easily yield a difference in the refractive index, the upper limit can be set suitably depending on the timing of the phase separation, and the like. The monomer having no molecular structure to decrease the refractive index in the polymer can be used with no especial limitation. Examples thereof include monomers constituting resin materials shown below.

<Resin Materials>

Resin materials are the same as those described in the first embodiment, so the description is omitted.

<Solvent>

The same solvent as in the antiglare layer-forming coating liquid can be used. The type of the solvent may be different from that of the antiglare layer-forming coating liquid.

In the present invention, since the antiglare layer-forming coating liquid and the low-refractive index layer-forming coating liquid are applied separately, the first polymer can be disposed in the upper portion of the coating layer, so a difference in refractive index can be yielded between the upper layer and the lower layer.

Further, since not only the phase separation with the first polymer but also with the other resin material is used, the amount of the first polymer compound involved in the lower layer can be decreased comparing the case where the first polymer alone is used for the upper layer. By selecting a resin relatively highly compatible with the first polymer as a resin other than the first polymer in the low-refractive index layer-forming coating liquid, the first polymer is hardly diffused in the lower layer and is likely to remain in the upper layer and thus, a probability that the first polymer is involved in the lower layer can be reduced.

(Coating Step)

Then, as shown in FIG. 5A, a low-refractive index layer-forming coating liquid 150 containing a first polymer 154 and a resin 155A as the upper layer, and an antiglare layer-forming coating liquid 151 containing resins 155B and 155C as a lower layer are applied on a support 16 to form a coating layer 152. In the coating step, in a production apparatus shown in FIG. 2, the support 16 (including some functional layer already formed) is fed from a film roll 12 by a feed machine 14. The running rate of the support 16 can be made, for example, 0.1 to 1.5 m/s.

The support 16 is guided by guide rollers 18 and fed in a dust eliminator 20. The dust eliminator 20 is so configured that dusts attached to the surface of the support 16 can be removed. A coating device 22 as coating means is installed downstream of the dust eliminator 20, and is so configured that the coating liquids can be simultaneously applied on the support 16 passed round a backup roller. The coating device 22 is composed of at least two slot dies A and B facing the continuous support as shown in FIG. 3; and the antiglare layer-forming coating liquid is applied from the slot die A on the upstream side in the running direction of the support, and the low-refractive index layer-forming coating liquid is applied from the slot die B on the downstream side to form a low-refractive index layer-forming coated film on an antiglare layer-forming coated film, and the coating layer 152 is thus formed on the support 16. The support 16 may be held on the backup roller.

The form of the slot dies, and the support have been described in the first embodiment, so the descriptions are omitted.

(Drying Step)

The support 16 having the coating layer 152 is conveyed to a drying zone 24.

In the drying zone 24, the solvent is evaporated; and as shown in FIG. 5B, in the upper layer, the first polymer 154 and the resin 155A are phase-separated to make the first polymer 154 unevenly distributed and a low-refractive index layer 160 is formed. In the lower layer, the resins 155B and 155C are phase-separated to form an antiglare layer 158 and form convexo-concave on the surface. The drying zone 24 is not especially limited, but usable ones are a hot air heating apparatus (for example, a heat treatment apparatus described in Japanese Patent Application Laid-Open No. 2001-314799, and the like), a heater heating apparatus, and the like.

In the drying step, it is preferable that the initiation of the phase separation of the upper layer is made earlier than that of the lower layer. By making the initiation of the phase separation of the upper layer earlier than that of the lower layer, since the low-refractive index layer-forming coating liquid can be prevented from being involved in the antiglare layer-forming coating liquid, a difference in refractive index can be yielded between the antiglare layer and the low-refractive index layer after the drying.

As a method for regulating the initiation of the phase separation, by regulating a ratio of components contained in the low-refractive index layer-forming coating liquid and the antiglare layer-forming coating liquid, that is, a ratio of solutes or a ratio of solvents in the each coating liquid, the times when the upper layer and the lower layer initiate the phase separation during the drying step can be controlled, and the initiation of the phase separation of the upper layer can be thereby made earlier than that of the lower layer. Specifically, in the case of the upper layer, by in advance adjusting the ratio of the solutes to a ratio at which the phase separation is caused as easily as possible, reducing the ratio of the solvent, or otherwise, the time at which the phase separation is initiated is made earlier; and in the case of the lower layer, by in advance making the ratio of the solutes a ratio at which the phase separation is caused as hardly as possible, raising the ratio of the solvent, or otherwise, the time at which the phase separation is initiated is made later. The ratio of components of each coating liquid can be adjusted so as to acquire desired timings of the initiation, for example, by beforehand measuring ratios of the solvent and ratios of the solutes at which the phase separation is caused.

By initiating the phase separation of the upper layer earlier than that of the lower layer in such a way, since the compound to decrease the refractive index in the upper layer is unevenly distributed in the upper layer, and can reduce a proportion of being involved in the phase separation of the lower layer, a refractive index difference can be yielded between the upper layer and the lower layer.

As a curing step of the coating layer in the downstream of the drying step, the coating layer is cured or crosslinked by heat rays or an active energy source (ultraviolet rays, electron beams or the like). The curing method can be selected depending on the kind of a curable compound, but for example, an ultraviolet irradiation apparatus 26 is used. The ultraviolet irradiation can form desired curing or crosslinking.

Depending on the material, a heat treatment zone for heat curing is installed to carry out desired curing or crosslinking in some cases. Alternatively, after the support 16 on which the coating layer is formed is taken up, oven heating may be carried out as another step, or a heat treatment after transportation may be carried out, in some cases. And, taking-up of the support 16 on which the antiglare layer and the low-refractive index layer are formed is carried out by a takeup machine 30 installed in the downstream of the curing step.

<Other Layers>

Other layers such as a hard coat layer, a forward scattering layer, a primer layer, an antistatic layer, an undercoat layer and a protecting layer are the same as those described in the first embodiment, so the descriptions are omitted.

Figure 6A:
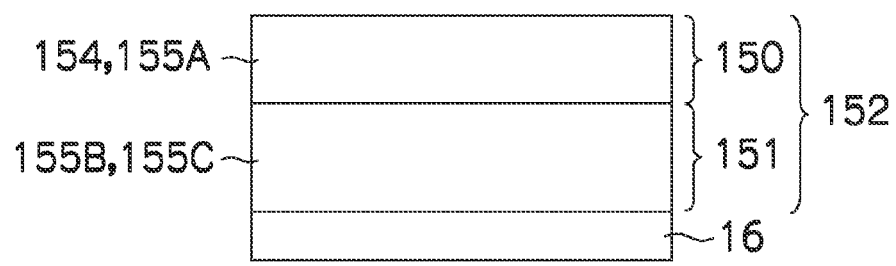
FIG. 6A is an explanatory diagram illustrating a coating step in another example of a production method of an antiglare film according to the second embodiment of the present invention.
Figure 6B:
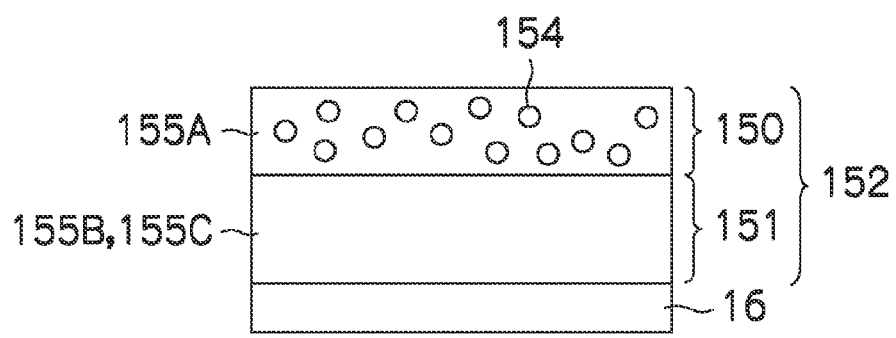
FIG. 6B is an explanatory diagram illustrating a phase separation in another example of a production method of an antiglare film according to the second embodiment of the present invention.
Figure 6C:
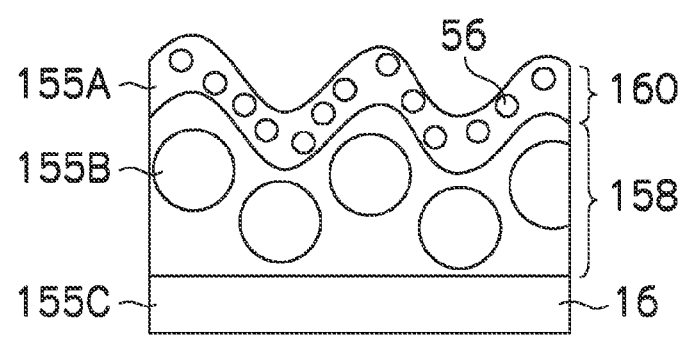
FIG. 6C is an explanatory diagram illustrating a low-refractive index layer and an antiglare layer obtained by another example of a production method of an antiglare film according to the second embodiment of the present invention.

FIGS. 6A to 6C are explanatory diagrams illustrating another example of a production method of an antiglare film. A coating step shown in FIG. 6A can be carried out by the same method as in FIG. 5A described before, so the description is omitted.

The phase separation of the low-refractive index layer-forming coating liquid of the upper layer is first carried out in the drying step to initiate the spinodal decomposition. The phase separation of the upper layer can make the first polymer 154 unevenly distributed in the low-refractive index layer-forming coating liquid as shown in FIG. 6B. Then, the phase separation of the antiglare layer-forming coating liquid of the lower layer is carried out, whereby convexo-concave can be formed on the surface as shown in FIG. 6C.

By carrying out the phase separation of the antiglare layer-forming coating liquid after the spinodal decomposition of the low-refractive index layer-forming coating liquid is initiated in such a way, since the low-refractive index layer-forming coating liquid already comes to hardly flow (move) when the phase separation of the antiglare layer-forming coating liquid is carried out, the first polymer becomes hardly involved in the antiglare layer-forming coating liquid. Therefore, since the first polymer is hardly involved in the antiglare layer, a difference in refractive index can easily be yielded between the low-refractive index layer and the antiglare layer.

In order to carry out the phase separation of the antiglare layer-forming coating liquid after the spinodal decomposition of the low-refractive index layer-forming coating liquid is initiated, the control can be made by regulating the ratios of the solutes and the ratios of the solvents contained in the low-refractive index layer-forming coating liquid and the antiglare layer-forming coating liquid.

EXAMPLES

Examples Corresponding to the First Embodiment

Hereinafter, features of the first embodiment according to the present invention will be described more specifically by way of Examples, but the scope of the present invention should not be construed to be limited to the specific examples shown below.

Example 1

An Upper Layer, a Low-Refractive Index Layer

The surface of a hollow silica particle having an average particle diameter of 20 nm was treated with 3,3,3-trifluoropropylmethyldichlorosilane to hydrophobize the surface of the particle. A composition shown below was dissolved in 82 parts by mass of methyl ethyl ketone to prepare a coating liquid. The critical solid-content concentration of this system is 71%.

| | |
|---|---|
| Acrylic resin | 15 parts by mass |
| Hydrophobic particle | 0.2 parts by mass |

(A Lower Layer, an Antiglare Layer)

A composition shown below was dissolved in 82 parts by mass of methyl ethyl ketone to prepare a coating liquid. The critical solid-content concentration of this system is 71%.

| | |
|---|---|
| Cellulose acetate propionate | 2 parts by mass |
| Acrylic resin | 15 parts by mass |

These liquids were applied on a triacetyl cellulose having a thickness of 80 μm (Fujitac, made by Fujifilm Corp.) by the simultaneous multi-layer application. The film thickness of the upper layer at the instant of the application is 50 μm. The film was windlessly dried at a temperature of 25° C. for 1 min after the application. At this time, it took a time of 3 sec until the amount of the solvent contained in the film decreased to half. After the windless drying for 1 min, the film was exposed to hot air at an air temperature of 100° C. and air velocity of 0.4 m/s to completely dry the solvent inside the film.

The antiglare film thus obtained was cut out into a predetermined size, pasted on a liquid crystal display, and evaluated for the appearance under the following standard.

The results are shown in FIG. 4.

Excellent . . . There was no whitening at all.
Good . . . Whitening was observed by attentive viewing (in a level of no problem as a product).
Fair . . . There was whitening to some degree (in a level of no problem as a product).
Poor . . . There was whitening.

Comparative Example 1

A coating liquid was formed as in Example 1, except for preparing the coating liquid of the upper layer with no particle added thereto, in Example 1.

Comparative Example 2

A coating liquid was formed as in Example 1, except for preparing the coating liquid of the upper layer with the particle not subjected to the hydrophobizing treatment in Example 1.

Example 2

A coating liquid was formed as in Example 1, except for altering the time until the solvent amount contained in the film decreased to half, to 2.95 sec by raising the room temperature after the application, in Example 1.

Example 3

A coating liquid was formed as in Example 1, except for altering the time until the solvent amount contained in the film decreased to half, to 2.5 sec by raising the room temperature after the application, in Example 1.

Example 4

A coating liquid was formed as in Example 1, except for altering the methyl ethyl ketone of the upper layer to 81 parts by mass in Example 1.

Example 5

A coating liquid was formed as in Example 1, except for altering the methyl ethyl ketone of the upper layer to 75 parts by mass in Example 1.

Example 6

A coating liquid was formed as in Example 1, except for altering the mass part of the hydrophobic particle to 0.1, and altering the time until the solvent amount contained in the film decreased to half, to 1.5 sec by raising the room temperature after the application, in Example 1.

Example 7

A coating liquid was formed as in Example 1, except for altering the mass part of the hydrophobic particle to 0.1, and altering the time until the solvent amount contained in the film decreased to half, to 1.2 sec by raising the room temperature after the application, in Example 1.

Example 8

A coating liquid was formed as in Example 1, except for altering the mass part of the hydrophobic particle to 0.1, and altering the methyl ethyl ketone of the upper layer to 60 parts by mass, in Example 1.

Example 9

A coating liquid was formed as in Example 1, except for altering the mass part of the hydrophobic particle to 0.1, and altering the methyl ethyl ketone of the upper layer to 45 parts by mass, in Example 1.

The results are shown in FIG. 4. By forming a low refractive index on the surface of an antiglare film, whitening due to irregular reflection could be prevented. One-time application could form both of an antiglare layer and a low-reflective index layer, and a production method advantageous in cost could be provided.

Comparative Example 1, which used no particle, could not prevent whitening. Also Comparative Example 2, which did not carry out the hydrophobizing treatment, could not prevent whitening. This may be caused because the particles could not completely move to the gas-liquid interface of the coating layer.

Examples Corresponding to a Second Embodiment

Next, features of a second embodiment according to the present invention will be described more specifically by way of Examples, but the scope of the present invention should not be construed to be limited to the specific examples described below.

That is, coating liquids described below were prepared, and applied on a triacetyl cellulose having a thickness of 80 mm (Fujitac, made by Fujifilm Corp.). The film thicknesses of an upper layer and a lower layer at the instant of coating were each 50 μm. The films were dried after the application by exposing to dry air. At this time, the drying was carried out at a drying rate of a solvent of 0.6 g/m$^2$·s. Thereafter, the films were subjected to a heat treatment at 100° C. for 1 min.

Example 1

An Upper Layer, a Low-Refractive Index Layer

A composition shown below was dissolved in 82 parts by mass of methyl ethyl ketone (MEK) to prepare a coating liquid.

| | |
|---|---|
| Copolymer of 2,2,2-trifluoroethyl acrylate | 4 parts by mass |
| Acrylic resin | 14 parts by mass |

(A Lower Layer, an Antiglare Layer)

A composition shown below was dissolved in 82 parts by mass of methyl ethyl ketone (MEK) to prepare a coating liquid.

| | |
|---|---|
| Cellulose acetate propionate | 2.1 parts by mass |
| Acrylic resin | 15.9 parts by mass |

As a result, in the upper layer, a phase separation was caused and a low-refractive index layer by the copolymer of 2,2,2-trifluoroethyl acrylate was formed; and also in the lower layer, a phase separation was caused and an antiglare layer was formed.

The antiglare film thus obtained was cut out into a predetermined size, and evaluated for whitening. The whitening was evaluated by pasting the obtained film on a liquid crystal display, and evaluating the appearance. The conditions and results of the Examples are shown in FIGS. 7A-A, 7A-B, 7B-A and 7B-B.

Excellent . . . There was no whitening at all.

Good . . . Whitening was observed by attentive viewing (in a level of no problem as a product).

Fair . . . There was whitening to some degree (in a level of no problem as a product).

Poor . . . There was whitening.

Comparative Example 1

A coated film was fabricated as in Example 1, except for using no copolymer of 2,2,2-trifluoroethyl acrylate, in Example 1.

Comparative Example 2

A coated film was fabricated as in Example 1, except for altering the copolymer of 2,2,2-trifluoroethyl acrylate to an alkylsilane compound, in Example 1.

Example 2

A coated film was fabricated as in Example 1, except for altering the weight ratio between the copolymer of 2,2,2-trifluoroethyl acrylate, the acrylic resin and MEK in the upper layer to 2.5:15.5:82, in Example 1.

Example 3

A coated film was fabricated as in Example 1, except for altering the weight ratio between the copolymer of 2,2,2-trifluoroethyl acrylate, the acrylic resin and MEK in the upper layer to 2.1:15.9:82, in Example 1.

Example 4

A coated film was fabricated as in Example 1, except for altering the weight ratio between the cellulose acetate propionate, the acrylic resin and MEK in the lower layer to 2.3:15.7:82, in Example 1.

Example 5

A coated film was fabricated as in Example 1, except for altering the weight ratio between the cellulose acetate propionate, the acrylic resin and MEK in the lower layer to 3.5:14.5:82, in Example 1.

Example 6

A coated film was fabricated as in Example 1, except for altering the weight ratio between the cellulose acetate propionate, the acrylic resin and MEK in the lower layer to 4:14:82, in Example 1.

Example 7

A coated film was fabricated as in Example 1, except for altering the weight ratio between the copolymer of 2,2,2-trifluoroethyl acrylate, the acrylic resin and MEK in the upper layer to 4:14:70, and altering the weight ratio between the cellulose acetate propionate, the acrylic resin and MEK in the lower layer to 4:14:82, in Example 1.

Example 8

A coated film was fabricated as in Example 1, except for altering the weight ratio between the copolymer of 2,2,2-trifluoroethyl acrylate, the acrylic resin and MEK in the upper layer to 4:14:79, and altering the weight ratio between the cellulose acetate propionate, the acrylic resin and MEK in the lower layer to 4:14:82, in Example 1.

Example 9

A coated film was fabricated as in Example 1, except for altering the weight ratio between the copolymer of 2,2,2-trifluoroethyl acrylate, the acrylic resin and MEK in the upper layer to 4:14:85, and altering the weight ratio between the cellulose acetate propionate, the acrylic resin and MEK in the lower layer to 4:14:82, in Example 1.

Example 10

A coated film was fabricated as in Example 1, except for altering the weight ratio between the copolymer of 2,2,2-trifluoroethyl acrylate, the acrylic resin and MEK in the upper layer to 2.1:15.9:80, and altering the weight ratio between the cellulose acetate propionate, the acrylic resin and MEK in the lower layer to 2.1:15.9:95, in Example 1.

Example 11

A coated film was fabricated as in Example 1, except for altering the weight ratio between the copolymer of 2,2,2-trifluoroethyl acrylate, the acrylic resin and MEK in the upper layer to 2.1:15.9:80, and altering the weight ratio between the cellulose acetate propionate, the acrylic resin and MEK in the lower layer to 2.1:15.9:82, in Example 1.

Example 12

A coated film was fabricated as in Example 1, except for altering the weight ratio between the copolymer of 2,2,2-trifluoroethyl acrylate, the acrylic resin and MEK in the upper layer to 2.1:15.9:80, and altering the weight ratio between the cellulose acetate propionate, the acrylic resin and MEK in the lower layer to 2.1:15.9:77, in Example 1.

Example 13

A coated film was fabricated as in Example 1, except for preparing a lower layer and an antiglare layer as follows.

(A Lower Layer, an Antiglare Layer)

A composition described below was dissolved in 82 parts by mass of methyl ethyl ketone to prepare a coating liquid.

| Polystyrene | 1.5 parts by mass |
|---|---|
| Acrylic resin | 16.5 parts by mass |

As a result, in the upper layer, a phase separation was caused and a low-refractive index layer by the copolymer of 2,2,2-trifluoroethyl acrylate was formed; and also in the lower layer, a phase separation was caused and an antiglare layer was formed.

Comparative Example 3

A coated film was fabricated as in Example 13, except for using no copolymer of 2,2,2-trifluoroethyl acrylate, in Example 13.

Comparative Example 4

A coated film was fabricated as in Example 13, except for altering the copolymer of 2,2,2-trifluoroethyl acrylate to an alkylsilane compound, in Example 13.

Example 14

A coated film was fabricated as in Example 13, except for altering the weight ratio between the copolymer of 2,2,2-trifluoroethyl acrylate, the acrylic resin and MEK in the upper layer to 2.5:15.5:82, in Example 13.

Example 15

A coated film was fabricated as in Example 13, except for altering the weight ratio between the copolymer of 2,2,2-trifluoroethyl acrylate, the acrylic resin and MEK in the upper layer to 2.1:15.9:82, in Example 13.

Example 16

A coated film was fabricated as in Example 13, except for altering the weight ratio between the polystyrene, the acrylic resin and MEK in the lower layer to 2.3:15.7:82, in Example 13.

Example 17

A coated film was fabricated as in Example 13, except for altering the weight ratio between the polystyrene, the acrylic resin and MEK in the lower layer to 3.5:14.5:82, in Example 13.

Example 18

A coated film was fabricated as in Example 13, except for altering the weight ratio between the polystyrene, the acrylic resin and MEK in the lower layer to 4:14:82, in Example 13.

Example 19

A coated film was fabricated as in Example 13, except for altering the weight ratio between the copolymer of 2,2,2-trifluoroethyl acrylate, the acrylic resin and MEK in the upper layer to 4:14:70, and altering the weight ratio between the polystyrene, the acrylic resin and MEK in the lower layer to 4:14:82, in Example 13.

Example 20

A coated film was fabricated as in Example 13, except for altering the weight ratio between the copolymer of 2,2,2-trifluoroethyl acrylate, the acrylic resin and MEK in the upper layer to 4:14:79, and altering the weight ratio between the polystyrene, the acrylic resin and MEK in the lower layer to 4:14:82, in Example 13.

Example 21

A coated film was fabricated as in Example 13, except for altering the weight ratio between the copolymer of 2,2,2-trifluoroethyl acrylate, the acrylic resin and MEK in the upper layer to 4:14:85, and altering the weight ratio between the polystyrene, the acrylic resin and MEK in the lower layer to 4:14:82, in Example 13.

Example 22

A coated film was fabricated as in Example 13, except for altering the weight ratio between the copolymer of 2,2,2-trifluoroethyl acrylate, the acrylic resin and MEK in the upper layer to 1.5:16.5:82, and altering the weight ratio between the polystyrene, the acrylic resin and MEK in the lower layer to 1.5:16.5:93, in Example 13.

Example 23

A coated film was fabricated as in Example 13, except for altering the weight ratio between the copolymer of 2,2,2-trifluoroethyl acrylate, the acrylic resin and MEK in the upper layer to 1.5:16.5:82, and altering the weight ratio between the polystyrene, the acrylic resin and MEK in the lower layer to 1.5:16.5:82, in Example 13.

Example 24

A coated film was fabricated as in Example 13, except for altering the weight ratio between the copolymer of 2,2,2-trifluoroethyl acrylate, the acrylic resin and MEK in the upper layer to 1.5:16.5:82, and altering the weight ratio between the polystyrene, the acrylic resin and MEK in the lower layer to 1.5:16.5:79, in Example 13.

As shown in FIGS. 7A-A, 7A-B, 7B-A and 7B-B, by forming a low refractive index on the surface of the antiglare film, whitening due to irregular reflection could be prevented. One-time application could form both of an antiglare layer and a low-refractive index layer, and a production method advantageous in cost could be provided.

Comparative Example 1 and Comparative Example 3, which used no copolymer of 2,2,2-trifluoroethyl acrylate, could not prevent whitening. Also Comparative Example 2 and Comparative Example 4, which used an alkylsilane compound having no fluorine compound, could not prevent whitening. They may be caused because a difference in refractive index was not yielded between the low-refractive index layer and the antiglare layer.

Examples 2 to 12 and Examples 13 to 24 reveal that: the earlier the spinodal decomposition (phase separation) of the upper layer started than the phase separation initiation of the lower layer, a low refractive index substance (the copolymer of 2,2,2-trifluoroethyl acrylate) is more unevenly distributed on the upper layer surface; the upper layer has a lower refractive index; the surface reflectance decreases; and apparent whitishness (whitening) of the antiglare film can be relaxed.

REFERENCE SIGNS LIST

10 . . . PRODUCTION APPARATUS OF ANTIGLARE FILM, 16 . . . SUPPORT, 22 . . . COATING DEVICE, 24 . . . DRYING ZONE, 26 . . . ULTRAVIOLET IRRADIATION APPARATUS, 50 . . . LOW-REFRACTIVE INDEX LAYER-FORMING COATING LIQUID, 51 . . . ANTIGLARE LAYER-FORMING COATING LIQUID, 52 . . . COATING LAYER, 54 . . . RESIN, 56 . . . PARTICLE, 58 . . . ANTIGLARE LAYER, 60 . . . LOW-REFRACTIVE INDEX LAYER, 150 . . . LOW-REFRACTIVE INDEX LAYER-FORMING COATING LIQUID, 151 . . . ANTIGLARE LAYER-FORMING COATING LIQUID, 152 . . . COATING

LAYER, 154 . . . FIRST POLYMER, 155 . . . RESIN, 158 . . . ANTIGLARE LAYER, 160 . . . LOW-REFRACTIVE INDEX LAYER

The invention claimed is:

1. A method for producing an antiglare film which comprises,
a step of preparing at least one antiglare layer-forming coating lquid in which at least two resin materials incompatible with each other are dissolved in at least one solvent, and a low-refractive index layer-forming coating liquid in which a resin material and hydrophobic particles are dissolved in a solvent;
a coating step of applying the low-refractive index layer-forming coating liquid as an upper layer and the antiglare layer-forming coating liquid as a lower layer on a support to form a coating layer;
a particle movement step of moving the particles to a gas-liquid interface of the coating layer; and
a drying step of drying the coating layer and making the coating layer cause phase-separation so as to form an antiglare layer and a low-refractive index layer
wherein, when a mass ratio of the particles to the solvent in the low-refractive index layer-forming coating liquid is represented by r [-], a time until the solvent decreases to half in the drying step is represented by t [s], and an initial film thickness of the upper layer in the coating, step is represented by d [m], the factors, r, t and d, are adjusted so that multiplication of 1/r and t and d satisfies $6 \times 10^{-2}$ or more.

2. The method for producing an antiglare film according to claim 1, wherein 80% or more of the particles in the low-refractive index layer-forming coating liquid are contained in the low-refractive index layer.

3. The method for producing an antiglare film according to claim 1, wherein the upper layer and the lower layer are simultaneously applied as a multi-layer in the coating step.

4. A method for producing an antiglare film, comprising:
a coating liquid preparation step of preparing an antiglare layer-forming coating liquid in which at least two resin materials incompatible with each other are dissolved in at least one solvent, and a low-refractive index layer-forming coating liquid in which a first polymer whose substituent contains a molecular structure to decrease a refractive index of whole polymer and one or more resin materials which form a phase-separation structure with the first polymer are dissolved in at least one solvent;
a coating step of applying the low-refractive index layer-forming coating liquid as an upper layer and the antiglare layer-forming coating liquid as a lower layer on a support to form a coating layer; and
a drying step of drying the coating layer making the low-refractive index layer-forming coating liquid and the antiglare layer-forming coating liquid cause phase-separation so as to form a low-refractive index layer and an antiglare layer,
wherein a ratio of the first polymer and the one or more resin materials to the at least one solvent in the low-refractive index layer-forming coating liquid, and a ratio of the at least two resin materials to the at least one solvent in the antiglare layer-forming coating liquid are adjusted in the coating liquid preparation step so that the initiation of the phase separation of the low-refractive index layer-forming coating liquid is earlier than the initiation of the phase separation of the antiglare layer-forming coating liquid in the drying step.

5. The method for producing an antiglare film according to claim 4, wherein the molecular structure to decrease the refractive index of the whole polymer, which is contained in the substituent contained in the first polymer is a molecular structure containing a fluorine molecule.

6. The method for producing an antiglare film according to claim 4, wherein the ratio of the first polymer and the one or more resin materials to the at least one solvent in the low-refractive index layer-forming coating liquid, and the ratio of the at least two resin materials to the at least one solvent in the antiglare layer-forming coating liquid are adjusted in the coating liquid preparation step so that the initiation of the phase separation of the antiglare layer-forming coating liquid is later than an initiation of spinodal decomposition of the low-refractive index layer-forming coating liquid in the drying step.

* * * * *